PILE ELEVATING MECHANISM

Filed June 5, 1959 10 Sheets-Sheet 1

INVENTOR
SHERMAN S. WATTS
BY Hudson, Boughton, Williams, David & Hoffmann
ATTORNEYS INVENTOR
SHERMAN S. WATTS
BY Hudson, Boughton,
Williams, David & Hoffmann
ATTORNEYS Sept. 13, 1960 S. S. WATTS 2,952,458

PILE ELEVATING MECHANISM

Filed June 5, 1959 10 Sheets-Sheet 3

INVENTOR
SHERMAN S. WATTS
BY Hudson, Boughton, Williams, David & Hoffmann
ATTORNEYS INVENTOR.
SHERMAN S. WATTS
BY Hudson, Boughton,
Williams, David & Hoffmann
ATTORNEYS

PILE ELEVATING MECHANISM

Filed June 5, 1959

10 Sheets-Sheet 5

INVENTOR.
SHERMAN S. WATTS
BY Hudson, Boughton, Williams, David & Hoffmann
ATTORNEYS INVENTOR.
SHERMAN S. WATTS
BY Hudson, Boughton, Williams, David & Hoffmann
ATTORNEYS

PILE ELEVATING MECHANISM

Filed June 5, 1959 10 Sheets-Sheet 7

INVENTOR
SHERMAN S. WATTS
BY Hudson, Boughton, Williams, David & Hoffmann
ATTORNEYS

PILE ELEVATING MECHANISM

Filed June 5, 1959 10 Sheets-Sheet 8

| RELAY COILS | |
|---|---|
| NO | LINE |
| 245 | 12 |
| 247 | 18 |
| 250 | 23 |
| 254 | 14 |
| 260 | 17 |
| 261 | 31-32 |
| 263 | 26 |
| 265 | 27 |
| 285 | 25 |
| 287 | 61 |
| 290 | 24 |
| 295 | 40 |
| 298 | 44 |
| 299 | 48 |
| 302 | 45 |
| 308 | 15 |
| 310 | 16 |
| 315 | 62 |
| 318 | 33 |
| 322 | 42 |
| 325 | 34 |
| 326 | 35 |
| 330 | 51 |
| 332 | 37 |
| 336 | 50 |
| 338 | 57 |
| 340 | 59 |
| 351 | 53 |
| 361 | 10-11 |
| 365 | 30 |
| 366 | 28 |

INVENTOR.
SHERMAN S. WATTS
BY Hudson, Boughton,
Williams, David & Hoffmann
ATTORNEYS

| LIMIT SWITCHES | |
|---|---|
| NO | LINE |
| 170 | 65 |
| 170' | 56 |
| 180 | 26 |
| 183 | 18 |
| 190 | 31 |
| 191 | 32 |
| 202 | 50 |
| 208 | 59 |
| 212 | 61 |
| 213 | 17 |
| 215 | 23 |
| 216 | 15 |
| 218 | 8 |
| 226 | 30 |
| 231 | 34 |
| 256 | 18 |
| 270 | 14 |
| 312 | 16 |
| 348 | 38 |
| 360 | 10 |

| SOLENOIDS | |
|---|---|
| NO | LINE |
| 145 | 49 |
| 347 | 38 |
| 405 | 71 |

INVENTOR.
SHERMAN S. WATTS
BY Hudson, Boughton, Williams, David & Hoffmann
ATTORNEYS Sept. 13, 1960 S. S. WATTS 2,952,458

PILE ELEVATING MECHANISM

Filed June 5, 1959 10 Sheets-Sheet 10

INVENTOR.
SHERMAN S. WATTS
BY Hudson, Boughton
Williams, David & Hoffmann
ATTORNEYS 2,952,458

PILE ELEVATING MECHANISM

Sherman S. Watts, Shaker Heights, Ohio, assignor to Harris-Intertype Corporation, Cleveland, Ohio, a corporation of Delaware Filed June 5, 1959, Ser. No. 818,314

37 Claims. (Cl. 271—62)

The present invention relates to a pile elevating mechanism for elevating a sheet pile while sheets are being periodically removed from the top thereof to maintain the top of the pile at approximately a predetermined level, and, more particularly, to such a mechanism having main and auxiliary hoists so that the pile may be replenished without interrupting the sheet removing operation.

It is conventional in a pile elevating mechanism to provide a main pile hoist and an auxiliary pile hoist disposed above the main pile hoist and adapted to take a remnant or partially depleted pile therefrom and continue its elevation while a new pile is being brought into position on the main hoist. Such a mechanism is shown in United States Patent No. 2,701,136 to Morton Schmidt. In this type of apparatus the main pile hoist is operated to intermittently elevate a pile of sheets thereon as the top sheets of the pile are removed and until the major portion of the pile is exhausted and a partially depleted or remnant pile remains. At this time the remnant pile is transferred from the main pile hoist to the auxiliary pile hoist, the latter then being operated to raise the pile as sheets are removed from the top of the remnant pile and while a new pile of sheets is placed on the main pile hoist. Conventionally the piles are supported on pallets with the pallets being engaged and lifted by the hoists to elevate the piles. After a new pile on a pallet has been brought into position, the new pile is elevated to a position where the top of the new pile is disposed in juxtaposition to the underside of the pallet supporting the remnant pile and the pallet supporting the remnant pile is subsequently withdrawn from below the remnant pile to deposit the remnant pile onto the top of the new pile thereby combining the piles, the main hoist then being operated to maintain the top of the combined pile at the proper level.

The proper operation of the conventional pile elevating mechanism is heavily dependent upon an attentive and alert operator because certain operations must be performed at particular times and preparatory steps must be taken for many of the operations. As a result, an operator must keep all steps in mind and be prepared when each is to take place.

It is an important object of the present invention to provide an elevating mechanism of the type described which is simplified in operation, requires less operator attention and is more foolproof than the prior art mechanisms, and in which a new pile may be brought into position in less time than heretofore required.

Another object of the present invention is to provide a new and an improved mechanism of the type referred to in which the auxiliary hoist, upon completion of the pallet withdrawal operation, is automatically positioned in its proper position for receiving the next remnant pile from the main hoist.

Still another object of the present invention is the provision of a new and an improved pile elevating mechanism of the type described in which the auxiliary hoist is automatically raised when the hoist arms are swung into position to take and support a pallet preparatory to lifting the pallet and pile thereon from the main hoist and is stopped when the pallet has been lifted by the auxiliary hoist.

Yet another object of the present invention is to provide a new and an improved pile elevating mechanism of the type described in which sensing means responsive to the position of the main hoist indicates when the pile is to be transferred from the main hoist to the auxiliary hoist, and in which the sensing means is effectively disabled in the event that the pallet on the main hoist is not in a level position and the nonlevel condition is signalled.

A further object of the present invention is to provide a new and an improved pile elevating mechanism of the type described in which the lifting of the pallet on the auxiliary hoist by a pile on the main hoist is sensed and signalled.

Further objects and advantages of the present invention will be apparent from the following description of the preferred embodiment thereof made with reference to the accompanying drawings forming a part of the present specification and in which.

Figure 1:
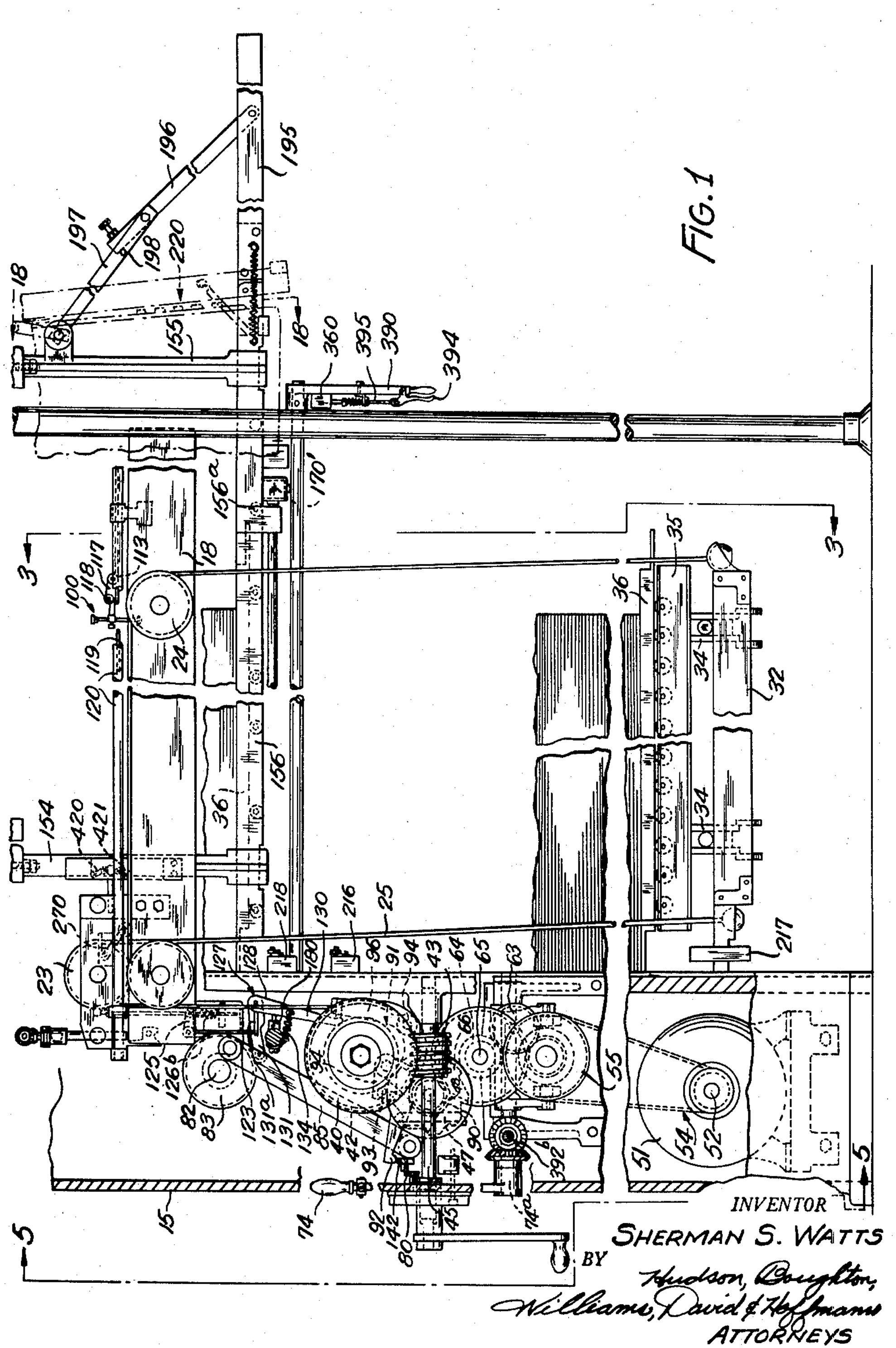
Fig. 1 is a side elevational view of a pile elevating mechanism embodying the present invention with parts thereof cut away or removed.
Figure 3:
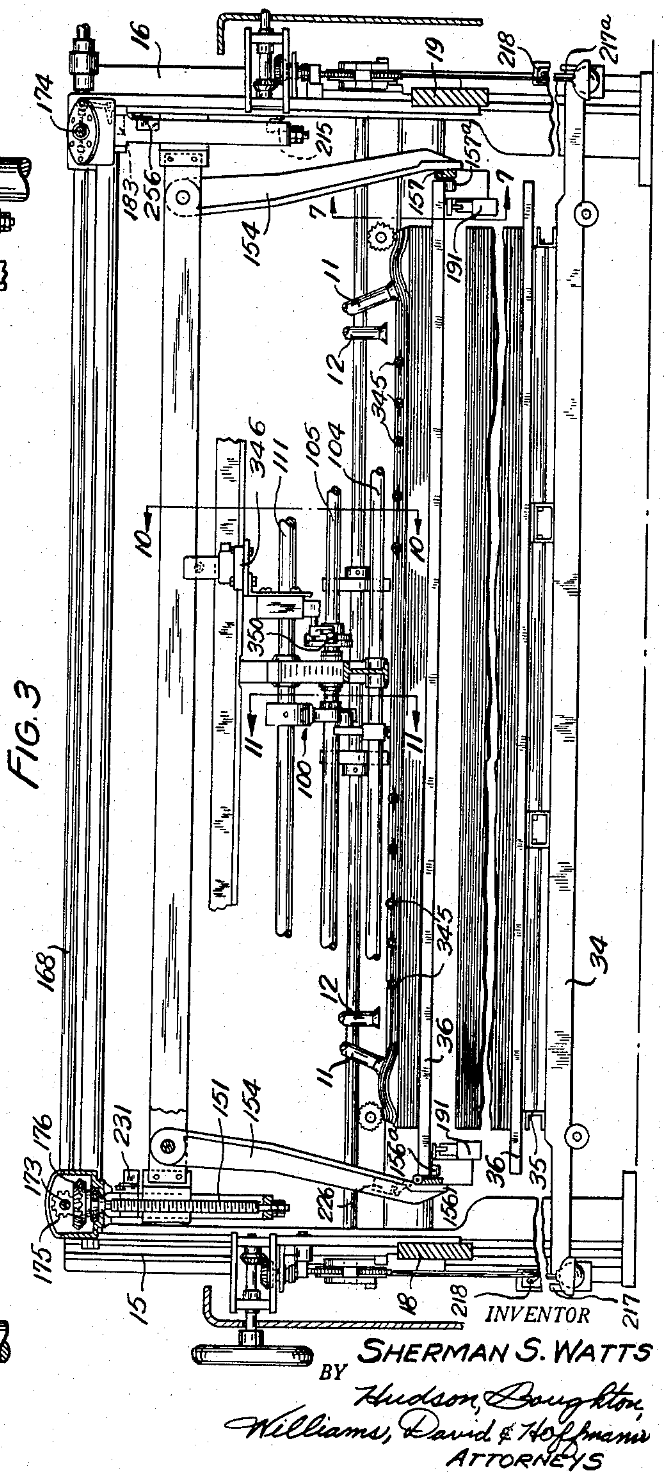
Fig. 3 is a vertical sectional view taken approximately along line 3—3 of Fig. 1.
Figure 10:
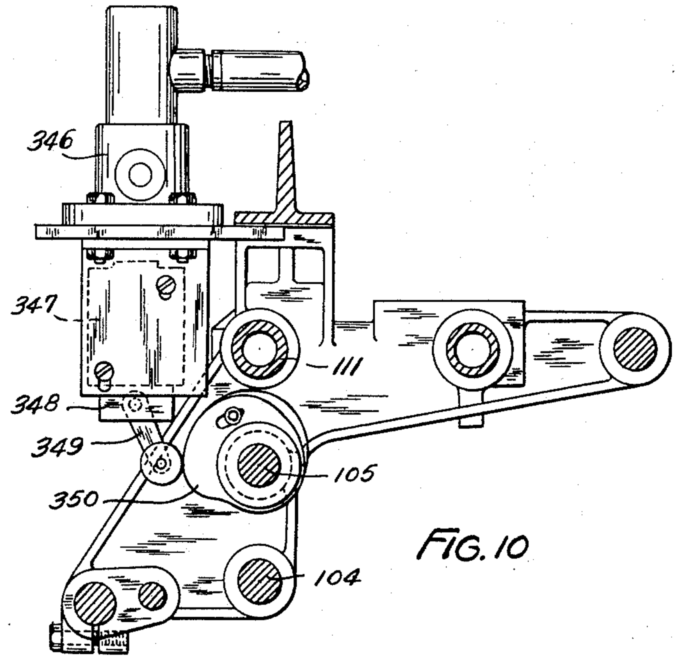
Figure 11:
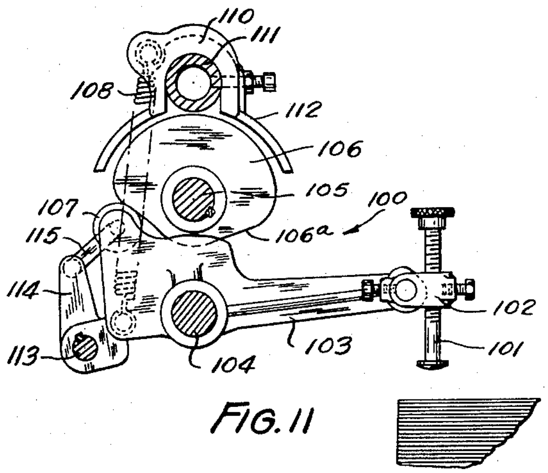
Figures 18, 21:
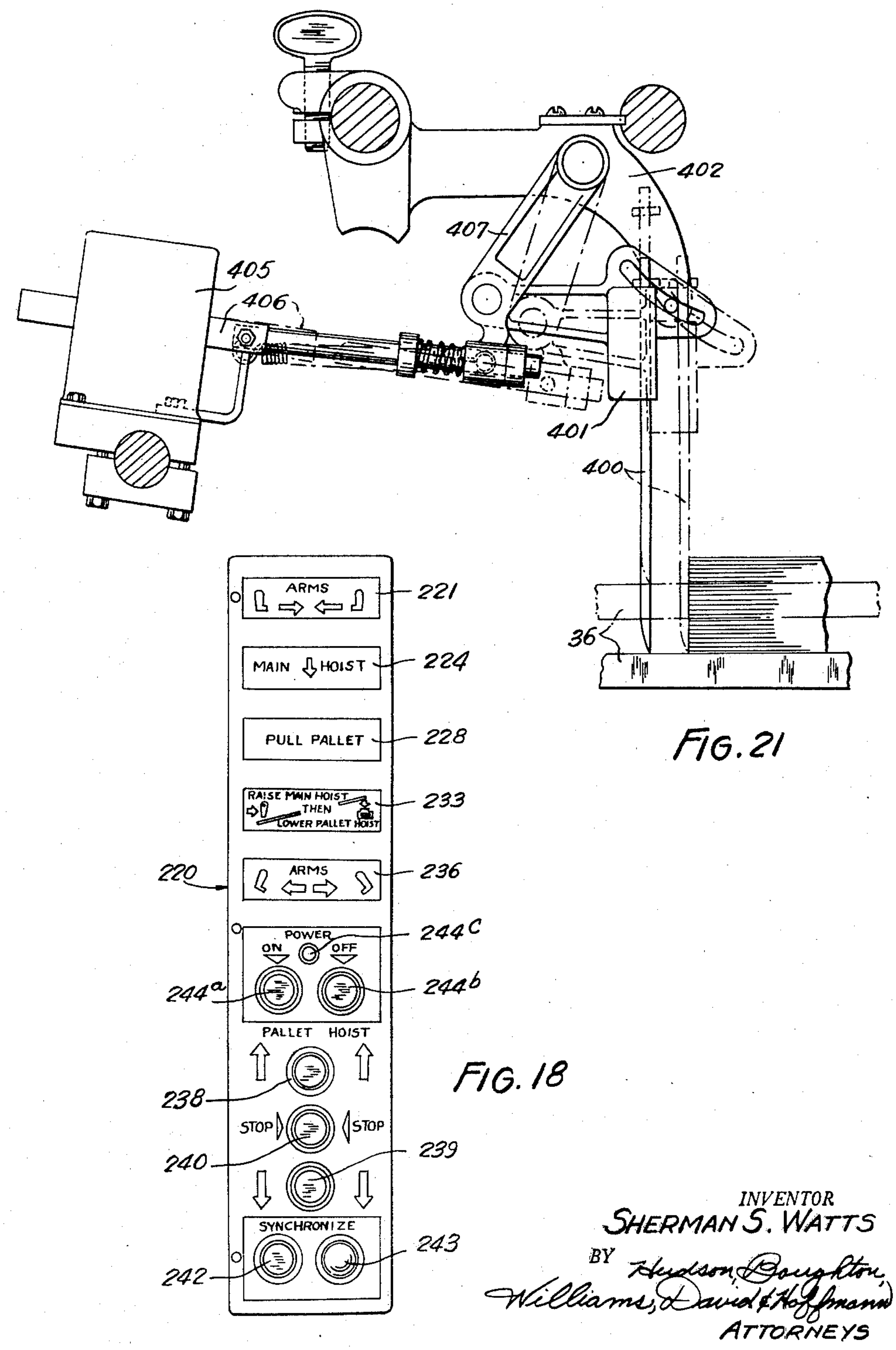
Figures 19, 19B:
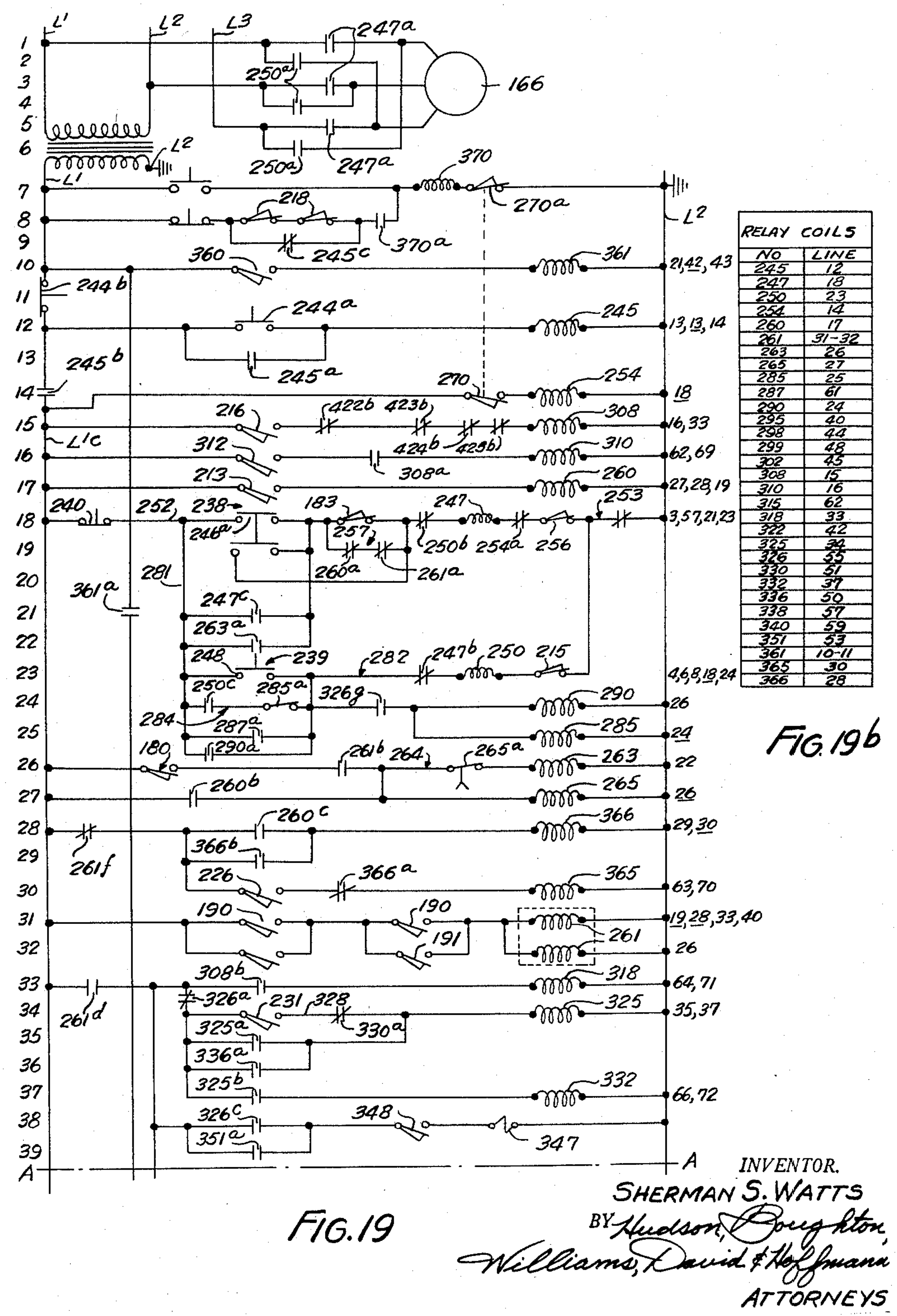
Figures 19A, 19C, 19D:
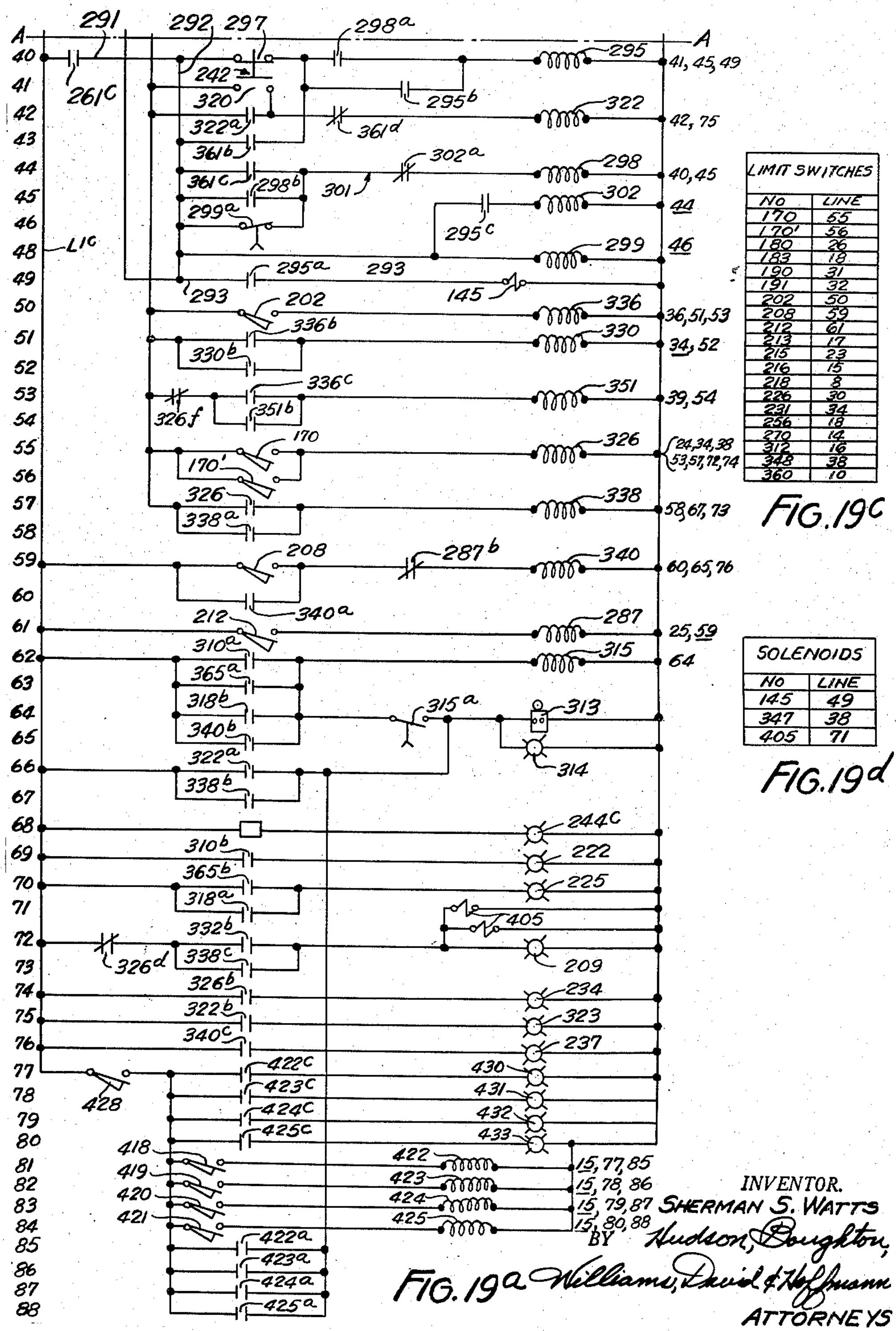
Figure 8:
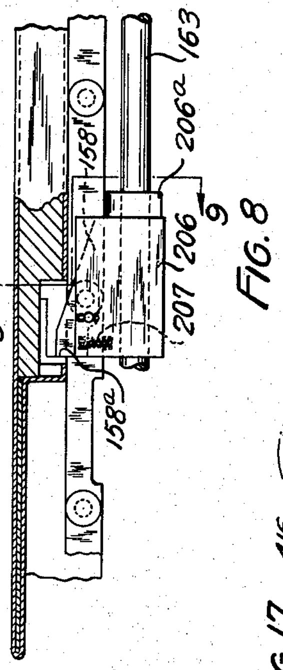
Fig. 8 is an enlarged fragmentary view of a portion of Fig. 7.
Figures 9, 22:
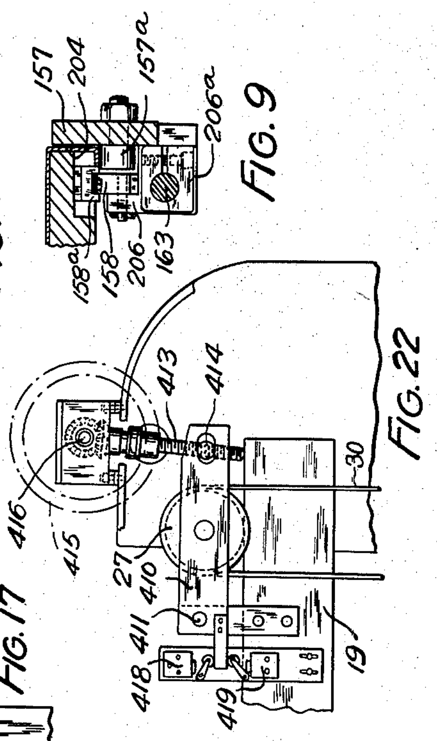
Fig. 9 is a sectional view taken approximately along lines 9—9 of Fig. 8.
Figure 17:
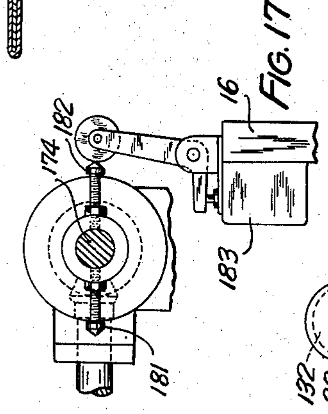
Figure 20:
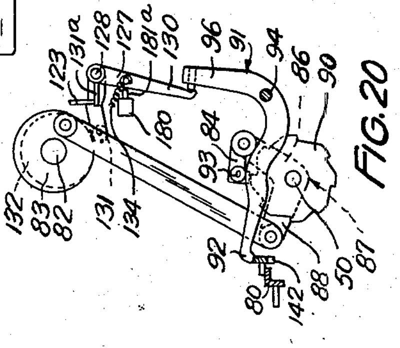
Figure 16:
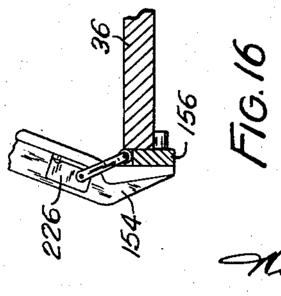

Figs. 10 and 11 are sectional views taken approximately from lines 10—10 and 11—11 of Fig. 3;

Figs. 12, 13, 14, 15, 16 and 17 are fragmentary views showing the locations of various switches;

Fig. 8 is a view of a control panel for the mechanism taken looking from line 18—18 of Fig. 1;

Figs. 19 and 19*a* constitute a circuit diagram for the elevating mechanism shown in Fig. 1;

Figs. 19*b*, *c* and *d* are locator tables for the relay coils, switches and solenoids in the circuit diagram of Figs. 19, 19*a*;

Fig. 20 is a fragmentary view showing the pawl and ratchet mechanism for operating the main hoist;

Fig. 21 is a view showing a backstop member adapted for use in the elevating mechanism of Fig. 1; and Fig. 22 is a fragmentary sectional view looking from line 22—22 of Fig. 3.

The pile elevating mechanism shown in the drawing comprises main and auxiliary pile hoists which operate to support a pile of sheets while the top sheets are periodically removed therefrom and to elevate the pile to maintain the top of the pile at an approximate level required for proper operation of sheet separating and forwarding means associated with the pile elevating mechanism. The sheet separating and forwarding means comprises separating suckers 11 adapted to pick up the top sheet of the pile and sheet forwarding suckers 12 for forwarding the separated sheet to conventional pull-in rolls, not shown, but which are disposed adjacent the front of the pile at approximately the level of the suckers 12 and are adapted to take the sheet and feed it to a sheet-handling mechanism.

The pile elevating mechanism shown includes front stationary columns 15, 16 and rear stationary uprights 17 and side frame members 18, 19 extending along the opposite sides of the mechanism and connecting the front and rear uprights on that side of the mechanism, the member 18 joining front column 15 and one rear upright 17, and side frame member 19 joining front column 16 and the other rear upright 17. Transversely spaced, stationary guides are provided between the front columns 15, 16 and are adapted to engage the front of the piled sheets being elevated to guide the sheets in their vertical movement.

As previously stated, the pile elevating mechanism includes a pile hoist for elevating a pile of sheets to a level where the top sheets are to be removed by the suckers 11 with the main pile hoist being operated intermittently to maintain the top of the pile thereon at the proper level. The main pile hoist includes front and rear pulleys 23, 24 mounted on the side member 18 and over which cables 25, 26, respectively, are trained, and front and rear pulleys 27, 28, respectively, mounted on side frame member 19 and over which cables 30, 31, respectively, are trained. The cables 25, 26 and 30, 31 have knobs at their lower ends adapted to be attached to the ends of longitudinal rails 32, 33 which carry cross rails 34 that extend under a skid or pallet platform 35 upon which a pallet 36 is adapted to be supported. The pallet 36 carries the pile of sheets to be removed one at a time by the sheet separating and forwarding mechanism. The longitudinal rail 32 is connected to the ends of cables 25, 26, while the longitudinal rail 33 is connected to the ends of cables 30, 31.

The cables 25, 26 and 30, 31 are wound on individual drums 40 fixed to a drum shaft 41 that extends between the front columns 15, 16 of the pile elevating mechanism and is generally supported therein. The drums 40 over which the cables 25, 26 are wound are fixed to the near end of the shaft as the elevating mechanism is viewed in Fig. 1, and the drums over which the cables 30, 31 are wound are fixed to the shaft 41 adjacent the remote end of the shaft as viewed in Fig. 1.

It can now be seen that rotation of the shaft 41 to wind or unwind the cables of the main hoist onto or from their respective drums will cause either the raising or the lowering of the main hoist. The drums 40 are narrow drums and the cables wrap on themselves as they are wound on the drums. The drums, therefore, have an effective diameter which varies with the amount of cable wound thereon and the amount of raising and lowering of the main hoist for a given angular rotation of the drums will depend upon the position of the hoist which is indicative of the length of cable wound on the drums.

In the preferred and illustrated embodiment, the drum shaft 41 has a worm wheel 42 fixed to the shaft adjacent the drums 40 for the cables 25, 26 and adjacent the front column 15. The worm wheel 42 meshes with a worm 43 disposed below the worm wheel 42 and fixed to a worm shaft 45 journaled in the column 15 and which extends outwardly thereof and has an outer end, square in cross section, for receiving a crank 46. The crank 46 has an opening therein opening into one side thereof, which opening is square at its inner end and cylindrical at its outer end so that when the crank is moved rightwardly, as viewed in Fig. 1, into driving relationship with the worm shaft it is disposed axially inwardly on the shaft to enable the crank to engage the square opening therein with the shaft, but is disengaged if moved outwardly to where the cylindrical part of the opening is about the square end of the shaft. When the crank is engaged, rotation thereof by hand will rotate the worm wheel 42 and the shaft 41 to raise or lower the main hoist manually.

The worm shaft 45 also has a bevel gear 47 fixed thereto adjacent the worm 43. The bevel gear 47 meshes with a cooperating bevel gear 48 fixed to a drive shaft 50 extending transversely of the front of the elevating mechanism and rotatable by power means to effect a power raising or lowering of the main hoist.

The drive shaft 50 may be selectively driven in either direction from a motor 51 mounted at the base of the column 15. The motor has a shaft 52 which is connected to drive a clutch shaft 53, disposed above the motor 51 and below the shaft 50 and journaled in the columns 15, 16, through a chain drive 54 which includes a gear or sprocket 55 fixed to the clutch shaft 53 and an input or driving gear or sprocket 56 fixed to the motor shaft 52. The motor 51 and, in turn, the clutch shaft 53 are continuously operated in one direction. The clutch shaft 53 may be connected to drive the drive shaft 50, to, in turn, effect a rotation of the cable drums 40, through a gear train 58 which effects rotation of the drive shaft 50 in one direction or through a gear train 59 which effects rotation of the drive shaft 50 in the opposite direction. The gear train 58 includes a gear 61 journaled on the clutch shaft 53 and a clutch mechanism 62 for clutching the gear 61 to the shaft 53 for rotation therewith. The gear 61 is in mesh with an idler gear 63 which, in turn, meshes with a gear 64 secured to a gear shaft 65 and in mesh with a gear 66 fixed to the drive shaft 50. When the clutch 62 is engaged, the gear 61 will effect a driving of the drive shaft 50 through the train 58 in a direction opposite to the direction of rotation of the clutch shaft 53.

The gear train 59 comprises a gear 68 journaled on the clutch shaft 53 and a gear 70 in mesh with the gear 68 and fixed to the gear shaft 65. The gear 68 may be selectively clutched to the shaft 53 by operation of a clutch mechanism 71 to effect rotation of the gear 68 with the shaft 53. When the gear 68 rotates with the shaft 53, the gear shaft 65 and the gear 70 thereon and in mesh with the gear 68 rotate in the opposite direction to the clutch shaft 53 which, in turn, effects rotation of the drive shaft 50 in the same direction as the clutch shaft 53 through the medium of gears 64 and 66. The clutch mechanisms 62, 71 are disposed adjacent each other on the clutch shaft 53 and each includes a driving clutch plate 72 which is slidably keyed to the clutch shaft 53 and which is movable to engage a respective driven clutch plate 73 secured to the gear driven by the respective clutch mechanism. The clutch plates are spring biased to a disengaged position. The driving clutch plates 72 may be selectively engaged with the driven plates by operation of a clutch actuating lever 74 fixed to a shaft **74*a* journaled for rocking movement about an axis above the clutch shaft 53 that extends perpendicular with respect to the shaft 53. The clutch actuating lever has a portion 75 which extends downwardly between the clutch plates 72 of the clutch mechanisms 62, 71 and carries a roller 76 which when the lever is swung in one direction engages and shifts the clutch plate 72 of the clutch mechanism 62 to engage the latter and actuate the drive shaft 50 in one direction and when swung in the other direction engages and moves the clutch plate 72 of the clutch mechanism 71 to its engaged position to rotate the shaft 50 in the opposite direction. The operating handle 74 extends upwardly above the pivot for the lever and in a position to be grasped by the operator. For purposes which will be explained hereinafter, the manual operating lever 74 is normally latched in a neutral position by a latch member 80 having a slot 81 therein adapted to receive a pin 81*a* on the manual operating lever 74. The latch member 80 must be moved clear of the pin 81*a* to permit the lever 74 to be operated to engage either the clutch 62 or the clutch 71 to drive the main hoist from the motor 51**.

During operation, the main hoist is operated in increments from the press drive to maintain the top thereof or of the pile thereon at an appropriate feed level. The mechanism for raising the main hoist in increments or in a stepwise manner comprises a continuously rotating crank shaft 82 which extends across the front of the pile elevating mechanism. When the pile elevating mechanism is used in connection with feeding apparatus for delivering sheets to a printing press, the shaft 82 is preferably driven directly from the printing press drive so as to be timed therewith.

The crank shaft 82 has secured to its end adjacent the column 15 a crank 83 which is connected by a link 85 to reciprocate a pawl 84. As is best shown in Figs. 1 and 20, the pawl 84 is pivoted to one end of one arm 86 of a bell-crank lever 87 journaled on the drive shaft 50, and the lever 87 also having an arm 88 to which the connecting link 85 is pivotally connected to effect a continuous reciprocation of the lever 87 and pawl 84 from the continuously rotating crank 83. The pawl 84 is adapted to engage and advance, in increments, a ratchet wheel 90 fixed to the drive shaft 50. The ratchet wheel 90 when rotated by the pawl 84 effects rotation of the shaft 50 in the direction necessary to raise the main hoist. The pawl 84 is disposed above the ratchet wheel 90 and drops by gravity into engagement with the ratchet teeth of the ratchet wheel 90 unless positively prevented from doing so.

The pawl 84 may be prevented from engaging the teeth of the ratchet wheel 90 when the pawl is reciprocated by raising a pawl lift member 91. The lift member 91 includes a lift arm 92 that extends generally horizontally below the pawl 84, the arm 92 having an upper arcuate surface which is adapted to engage a roller 93 on the pawl 84 and to lift the pawl clear of the ratchet teeth 90 when the arm 92 and the lift member 91 are raised. The pawl lift member 91 is pivoted, as indicated at 94, so that rotation of the lift member 91 in a clockwise direction about the pivot 94 effects a lifting of pawl 84 and prevents it from engaging the teeth of the ratchet wheel 90. The pivotal connection between the pawl 84 and its supporting arm 86 of bellcrank lever 87 permits reciprocation of the bell-crank lever 87 by the crank 83 when the pawl is lifted.

When the main hoist is being operated under the control of pile height detecting means, the lift member 91 is raised when the top of the pile on the main hoist is at the proper level for removing sheets therefrom and the lift member 91 is lowered to permit the pawl 84 to engage the teeth on the ratchet wheel 90 when the level drops to a point where the main hoist should be elevated. To this end, the pawl lift member 91 has a portion 96 which extends upwardly therefrom adjacent the pivot 94 and which is operated under the control of the pile height detecting means to raise and lower the pawl lift arm 91.

In the illustrated mechanism, the pile height detecting means is designated by the reference numeral 100 and is supported above the rear edge of the pile from which sheets are being separated by the separating suckers 11. As is shown in Fig. 1 and Fig. 11, the pile height detecting means comprises a detecting finger 101 which extends generally vertically and which is threaded into a support block 102 fixed to the end of a detecting arm 103 rockable on a shaft 104 extending transversely of the pile elevating mechanism and stationary during the operation of the elevating mechanism. The block 102 is angularly adjustable about an axis parallel to the shaft 104 and the detecting finger 101 may be threaded into or out of the block 102 to adjust the depending length of the finger.

The detecting arm 103 and, in turn, the detecting finger 101 is rocked toward engagement with the top rear edge of the pile from which sheets are being taken once during each cycle of operation, a cycle of operation occurring between the times each sheet is removed from the pile. The rocking of the detecting arm 103 is accomplished, in the illustrated embodiment, by means of a cam which is fixed to a continuously rotating cam shaft 105 disposed immediately above the shaft 104 which supports the detecting arm 103 and having a cam 106 fixed thereto for rotation therewith. The cam 106 cooperates with a cam follower 107 fixed to a portion of the detecting arm 103 on the side of the shaft 104 remote from the detecting finger 101 to effect an oscillation of the detecting arm 103. The roller 107 is urged into engagement with the cam 106 by a spring 108 connected between the detecting arm 103 and a cam guard 110 fixed to a stationary shaft 111 above and parallel to the shafts 104, 105. The cam guard 110 also has portions 112 which function as a guard for the cam 106. When the cam 106 is rotated, the cam has a low portion 106*a* which allows the spring 108 to move the detecting arm 103 clockwise about the rockshaft 104, as the latter is viewed in Fig. 11 to move the detecting finger 101 downwardly toward engagement with the top of the pile. If the detecting finger 101 engages the top of the pile, the cam follower 107 will not follow the cam 106 and the rocking movement will stop until the high portion of the cam 106 lifts the detecting finger 102 from the pile when the high portion thereof engages the cam follower 107 to move the detecting arm 103 in a counterclockwise direction. If the height of the pile is such as to allow the cam follower 107 to follow the cam when it is riding toward the low portion, the arm 103 rocks an angular amount which is greater than when the level of the pile is such as to prevent the follower from following the cam 106.

When the detecting arm 103 rocks on its shaft 104, a detector rockshaft 113 extending parallel to the shaft 104 rearwardly and downwardly thereof is rotated or rocked an angular amount corresponding to the rocking of the detecting arm 103. The shaft 113 has an arm 114 keyed thereto and extending upwardly therefrom with the upper end of the arm being connected to the detecting arm 103 by a link 115 pivoted to the arm 114 and to the rocker member 103 on the axis of the cam follower 107. It can be seen, therefore, that the angular rotation of the shaft 113 is indicative of the height of the pile and the adjustment of the detector is such that when the shaft 113 rocks a predetermined angular amount, it is a signal that the pile height is too low.

Figure 2:
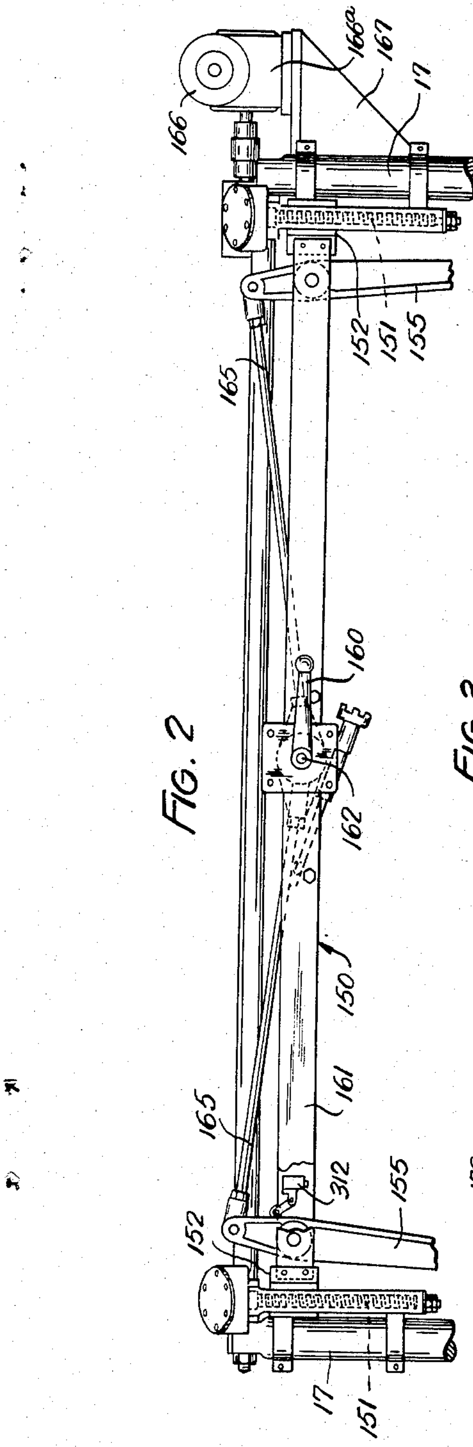
Fig. 2 is a fragmentary view looking at the rear of the elevating mechanism shown in Fig. 1 and from the right-hand side of the mechanism as it is viewed in Fig. 1.

The end of the shaft 113 adjacent the side frame 18 has fixed thereto an arm 117 which carries a roller 118 at its outer end that is engageable with a laterally extending flange 119 on a shaft 120 that extends parallel to the side frame member 18 and to the front column 15. When the shaft 113 is oscillated, the arm 117 moves downwardly to engage the flange 119 of the shaft 120 to effect a corresponding pivotal movement of the shaft 120. The angular movement of the shaft 120 controls the pawl lift member 91. The shaft 120 is connected to control the pawl lift member 91 so that when it oscillates counterclockwise, as viewed in Fig. 20, to a predetermined angular position, the pawl 84 is allowed to engage the ratchet wheel 90 and when it is oscillated in the opposite direction a predetermined amount from the position where the pawl is engageable, prevents engagement of the pawl 84 with the ratchet wheel 90. To this end, an arm 121 is fixed to the forward end of the shaft 120 and extends radially outwardly therefrom and inwardly of the elevating mechanism. A rod 122 is adjustably connected to the outer end of the arm 121 so as to move downwardly therewith and extends downwardly therefrom to effect the rocking of a vertical latch member 123 in accordance with the rocking of the shaft 120. The latch member 123 is pivoted for rocking movement about a pivot pin 124 and extends downwardly therefrom and has a rearwardly extending arm 125 which is connected to the rod 122 by a noddle pin connection 126. A set-screw 126*a* adjustably fixes the noddle pin 126 to the rod 122. A spring 126*b* is disposed about the rod 122 and engages the noddle pin and a frame member through which the lower end of the rod 122 freely slides. The spring 126b urges the rod 122 upwardly and, in turn, the latch member 123 in a counterclockwise direction, as viewed in Fig. 1, and shaft 120 in a clockwise direction, as viewed in Fig. 2. The flange 119 on shaft 120 is therefore urged toward engagement with the roller 118 rocked by the detector shaft 113.

The latch member 123 is adapted to control the rocking movement of a bell-crank lever 127 which is rockable about a pivot connection 128 and is connected to reciprocate the pawl lift arm 91 (see Figs. 1 and 20). The bell-crank lever 127 includes an arm 130 which extends downwardly to a position adjacent the upper end of the arm 96 of pawl lift member 91 and an arm 131 which extends forwardly from the pivot 128 to a position adjacent a cam 132 fixed to the crank shaft 82 for rotation therewith. It will be recalled that shaft 82 is a continuously rotating shaft. The cam 132 cooperates with a cam follower 133 fixed to the outer end of the arm 131 of the bell-crank lever 127 and is shaped to effect a rocking movement or a reciprocating movement of the bell-crank lever 127 for each rotation of the cam 132. The cam follower 133 is urged into engagement with the cam 132 by a tension spring 134 connected to the bell-crank lever 127 and the frame and which urges the bell-crank lever in a clockwise direction about its pivot to urge the cam follower 133 into engagement with the cam 132. If the cam follower 133 is prevented from moving or following the cam 132 when the low portion thereof approaches the cam follower 133, the pawl lift member 91 will be maintained in a raised position since the lift member 91 is lifted by the bell-crank lever when the cam follower 133 is riding on the high portion of the cam 132 and is lowered to permit engagement of the pawl 84 when the follower 133 is riding on the low portion of cam 132. The latch member 123 is pivoted above the arm 131 of the bell-crank lever 127 and when disposed in a vertical position engages a stop 131a on the arm 131 and prevents the arm 131 and the cam follower 133 thereon from following the cam 132 to maintain the pawl lift member in a lift position which keeps the pawl 84 from engaging with the ratchet wheel 90. If, however, the pile height level is detected to be too low, the latch member 123 is moved to a position out of engagement with the stop 131a, which allows the bell-crank lever 127 to be moved clockwise by the spring 134 under the control of cam 132. This in turn frees the lift arm 91 to move counterclockwise under the influence of gravity to allow the pawl 84 to engage the teeth on the ratchet wheel 90 to rotate the same and effect an incremental raising of the main hoist. It will be understood that the timing of the rocking of the lift member 91 under the control of cam 132 is such that the lift arm 92 is down before the pawl 84 is actuated in the driving portion of its reciprocatory movement.

Figures 6, 12, 13, 14, 15:
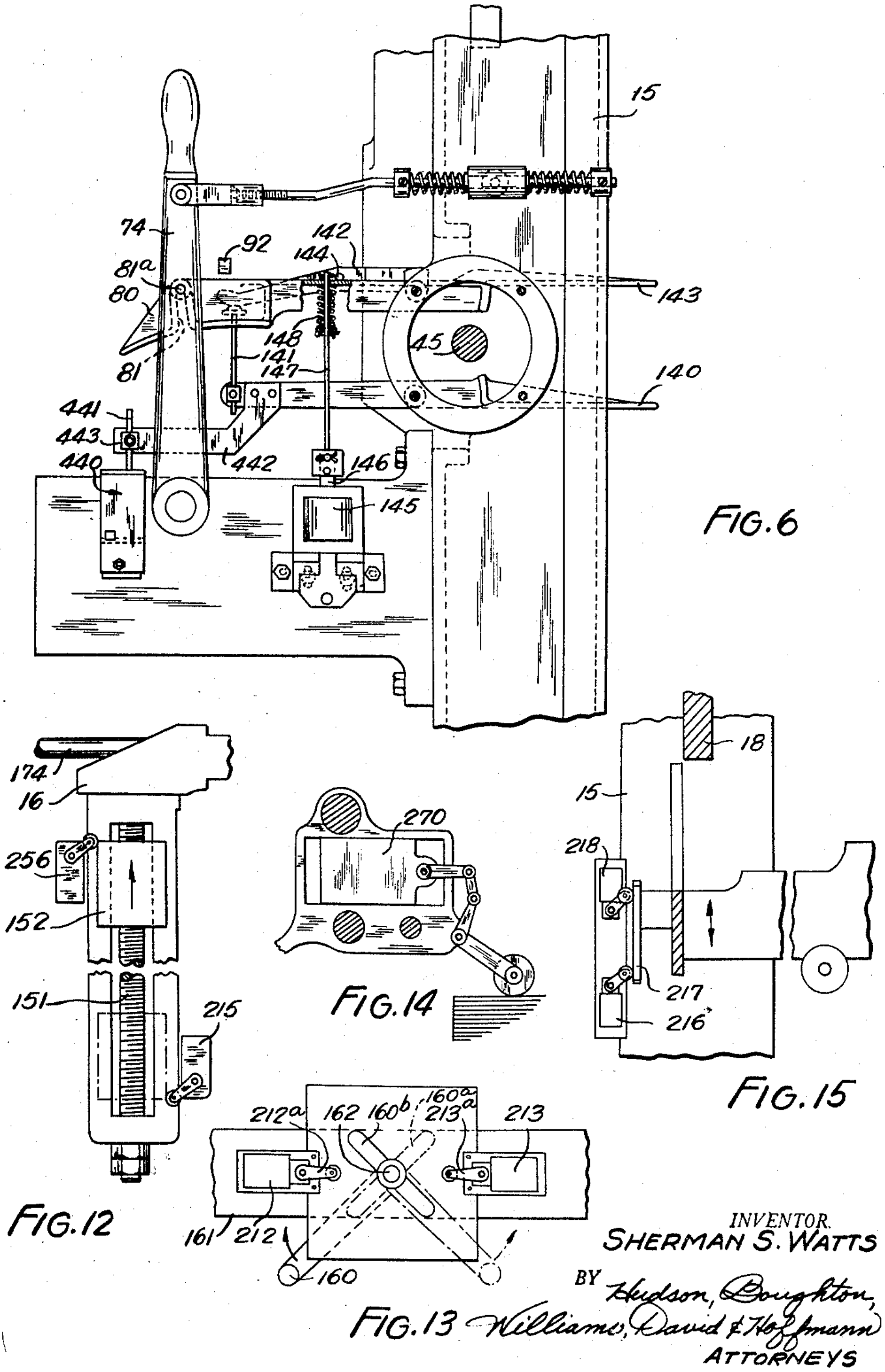
Fig. 6 is an enlarged fragmentary view of a portion of Fig. 6.

When it is desired to operate the main hoist manually or by the motor 51, the pawl or pawl lift member 91 should be operated to hold the pawl 84 out of engagement with the ratchet wheel 90. For this purpose, a manually operated lever 140 is provided adjacent the manually operated crank 46. The actuating lever 140 is pivoted to the column 15 and has one end adapted to be grasped by the operator and a portion which extends inwardly toward the ratchet wheel 90 and the inner end thereof has a push rod 141 extending upwardly therefrom which is adapted to engage a lever 142 pivoted to the column 15 on the same axis as the latch lever 80. The lever 142 extends inwardly and has a portion under the end of arm 92 of the pawl lift member 91 and lifts the latter when the lever 142 is actuated to a raised position, as shown in Fig. 6. The rod 141 slides through an opening in a lateral flange in latch lever 80 and is guided thereby.

The latch lever 80 which prevents operation of the clutch shifting lever 74 is, as mentioned above, pivoted to the column 15 and has a portion designated by the reference numeral 143 which may be grasped by the operator to lift the latch lever 80. The lever 142 is provided with a pin 144 which extends over the latch lever 80 so that when the latter is raised to release the clutch actuating lever 74, the lever 142 and, in turn, the pawl lift member 91 are raised to assure that the pawl 84 does not engage the ratchet wheel 90 while the main hoist is being raised or lowered by the motor 51 through the clutch mechanism.

In addition to the mechanism described above, a solenoid 145 is mounted below the latch lever and is energizable to effect a lifting of the latch lever 80 and lever 142. The solenoid 145 has an armature 146 which extends upwardly therefrom and which is raised when the solenoid is energized. The upper end of the armature 146 is connected to the latch lever 80 by a rod 147 pivoted on the armature and received in an opening in a flange on the latch lever. A spring 148 is disposed about the rod and abuts a shoulder or collar on the rod and the underside of the flange of the latch lever.

As is evident from the foregoing, the pile height detecting means is effective through the ratchet wheel 90 and the pawl 84 to intermittently effect an incremental raising of the main hoist to maintain the top of a pile supported thereon at the proper level for the suckers 11 to remove sheets therefrom. After the main hoist has been elevated a predetermined amount, preferably when approximately seven inches of remnant pile remains on the pallet, the pallet supporting the pile is transferred from the main hoist to an auxiliary hoist disposed above the main hoist and adapted to continue the intermittent elevation of the remnant pile to maintain the top thereof at feed level while a new pile is being brought into position on the main hoist. In the illustrated embodiment, the auxiliary hoist comprises a rectangular frame 150 supported above the main hoist by four lead screws 151. One of the lead screws 151 is disposed at each corner of the frame 150 and a nut 152 mounted on each corner of the rectangular frame threads onto the adjacent lead screw. Rotation of the lead screws 151 in one direction raises the frame 150, while rotation in the opposite direction lowers the frame 150.

The frame 150 has a pair of front arms 154 depending therefrom adjacent the opposite front sides of the frame and a pair of rear arms 155 depending therefrom adjacent the opposite sides of the frame at the rear of the mechanism. Each pair of front and rear arms adjacent the corresponding sides of the pile elevating mechanism is joined by a pallet supporting rail extending front to rear, with the pallet supporting rail adjacent the side frame member 18 being designated by the reference numeral 156, and the rail along the side of the press adjacent the side frame member 19 being designated by the reference numeral 157. The rails 156, 157 each have a plurality of rollers 156a, 157a mounted on the inner side thereof so as to extend inwardly therefrom in position to engage the underside of a pallet and support the latter on the auxiliary hoist. The arms 154, 155 are connected to the frame 150 for swinging movement toward and away from each other, i.e., the arms on one side of the frame 150 are swingable toward and away from the arms on the other side of the frame so that the arms may be swung to and from pallet-engaging position. A latch member 158 is mounted on a rod 163 carried by front and rear blocks 164 fixed to the rail 157. The rod 163 is axially slidable in the blocks 164 and the latch member is adjustable along the rod.

The arms 154, 155 may be swung to and from pallet-engaging position by the operation of a crank 160 supported on a rear transverse frame member 161 comprising spaced parallel plate members and constituting a part of the frame 150 and joining the nuts 152 at the rear end of the frame 150. The crank 160 is fixed to a shaft 162 which mounts a pair of eccentrics, not shown in detail, that have eccentric straps which are tied to the upper ends of the rear arms 155 by links 165. The eccentrics and their cooperating straps are not described in detail since the mechanism is disclosed in application Serial No. 735,446, filed by Norman W. Taylor on May 12, 1958, and per se form no part of the present invention. It should be noted, however, that the shaft 162 extends inwardly of the frame member 161 for purposes hereinafter explained in detail.

Figure 4:
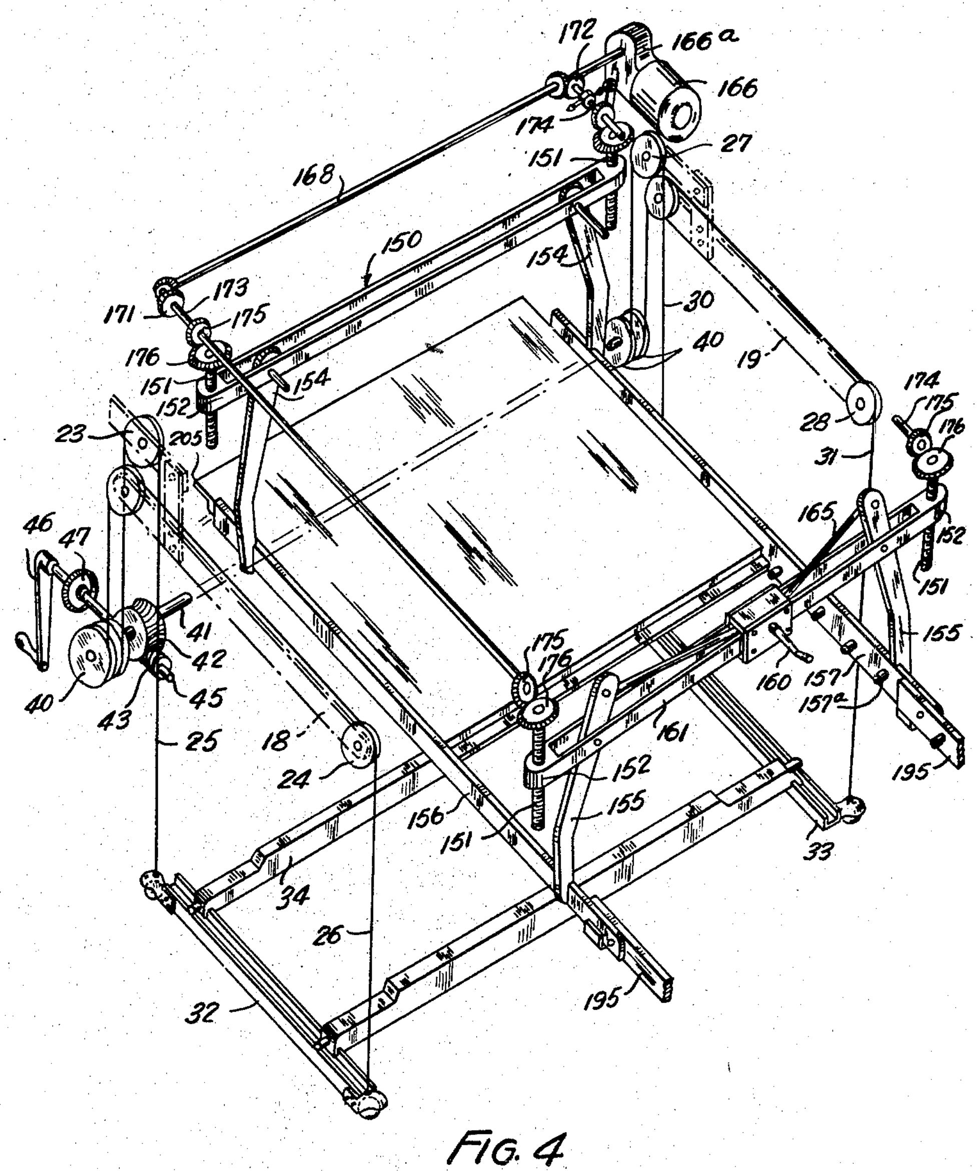
Fig. 4 is a diagrammatic view showing the hoist of the pile elevating mechanism of Fig. 1.

To raise and lower the frame 150 and the arms 154, 155, the screws 151 are rotated by a reversible motor 166 mounted on a bracket 167 supported by the front column 16. The motor 166 is connected by means of reduction gearing 166a to drive a shaft 168 extending across the elevating mechanism at the front thereof and having bevel gears thereon meshing with bevel gears 171, 172 fixed to shafts 173, 174, respectively, that extend along the opposite sides of the pile elevating mechanism with the shaft 173 extending along the near side of the mechanism, as viewed in Figs. 1 and 4. The shafts 173, 174 have bevel gears 175 fixed thereto which mate with respective ones of bevel gears 176 fixed to the lead screws 151 to effect rotation of the latter. It can now be seen that rotation of the motor 167 in one or the other of its directions will raise or lower the frame 150 depending upon the direction of rotation.

The auxiliary hoist is operated to take a pallet from the main hoist by lowering the auxiliary hoist with the arms swung out to a position where the rails 156, 157 are below the pallet, swinging in the arms to position the rollers 156a, 157a under the pallet, and then raising the auxiliary hoist to lift the pallet from the main hoist.

After the auxiliary hoist has been operated to take a pallet with a remnant pile of sheets thereon from the main hoist, the motor 166 is operated incrementally under the control of the pile height detector 100 to maintain the top of the remnant pile at the proper level for the suckers 11 to remove sheets therefrom. To this end, a switch 180 (see Fig. 20) is mounted adjacent the bell-crank lever 127. It will be recalled that the bell-crank lever 127 is reciprocated by the spring 134 and the cam 132 which is continuously rotated during the operation of the pile elevating mechanism when the pile height detecting mechanism detects a low level, the pile height detecting mechanism 100 operating through the latch 123 to release the bell-crank lever 127 for control by the spring 134 and cam 132. If the pile is low, the latch member 123, as described in describing the main hoist, is moved to allow the lever 127 to follow the cam 132. If the pile level is at or above the minimum to be maintained, the latch prevents the bell-crank lever 127 from following the cam 132 and the movement thereof is, therefore, indicative of the need for raising the top of the pile from which sheets are being taken. The switch 180 has an actuator 180a engaged by the arm 130 of the bell-crank lever 127 to momentarily close the switch when the latch member 123 allows reciprocation thereof at the time the pile level is low. The switch is of the type which is closed momentarily by the movement of the arm 130 in its clockwise direction to engage the actuator 180a, as viewed in Fig. 20, but is not actuated by movement in the counterclockwise direction. The actuator 180a is a reciprocable rod spring-biased toward engagement with the arm 130, but the details of the switch and its actuator are not shown since it is commercially available and elevating mechanisms using such a switch are conventional.

The closing of the switch 180 will, only if a pile is on the auxiliary hoist, effect energization of the motor 166 to raise the auxiliary hoist. The rotation of the motor 166 to raise the auxiliary hoist will be stopped after the pile has been raised sufficiently to enable spring 126b to cause latch 123 to lock out the lever 127 and after the auxiliary hoist has been raised a predetermined incremental amount. The stopping of the motor is caused by the operation of a pair of dogs 181, 182 fixed to the opposite sides of the shaft 174 adjacent the front end thereof. The dogs 181, 182 are spaced 180° apart so that the ends are adapted to strike the actuator of a limit switch 183 mounted adjacent the shaft 174. As the shaft 174 is rotated, one of the dogs within 180° of revolution will momentarily actuate the switch 183 as it moves past its actuator. The switch 183 is connected into the motor circuit for the motor 166 to effect deenergization of the motor if the energization thereof has been effected by the momentary closing of the switch 180. Since the bell-crank lever 127 is reciprocated in each cycle when the pile is low, the motor may be repeatedly energized and de-energized by the combined operation of the switch 180 and the switch 183 until the auxiliary hoist is raised sufficiently to enable the latch member 123 to be moved into position to prevent the bellcrank lever 127 from reciprocating to close the switch 180.

The auxiliary hoist is placed under the control of the pile height detecting means and the pawl 84 lifted whenever the auxiliary hoist takes a pile from the main hoist and preferably remains under the control of the detecting means as long as a pallet is in supporting position on the auxiliary hoist. To this end, sensing or signalling means comprising a plurality of limit switches are provided on the rails 156, 157, there being a limit switch 190 on each rail adjacent the front end of the rail and a limit switch 191 adjacent the rear end of each rail for reasons which will appear hereinafter. The switches 190 are closed by a pallet on the auxiliary hoist when it is in normal pile-supporting position, and switches 191 are closed by the pallet when it is being withdrawn and while it is supporting only the rear edge of the remnant pile, as described hereinafter. The switches 190, 191 are connected into the control circuit for the motor 166 so that if either set is actuated, the switch 180 may be rendered effective to operate or energize the motor 166 and when neither set is actuated, the switch 180 is ineffective to effect energization of the motor 166.

After the auxiliary hoist has been elevated to a predetermined point where the pile thereon has only a relatively few number of sheets left and preferably when the pile is approximately 1½" high, the pallet supporting the pile on the auxiliary hoist is withdrawn in a first stage to deposit the majority of the remnant pile thereon onto the top of a new pile on the main hoist. To support the pallet as it is withdrawn from below the remnant pile, each of the rails 156, 157 is provided with an extension 195 which is connected to the rear end of the corresponding rails 156, 157 and swings between an operative position in alignment with the rail and a generally vertical inoperative position. Each rail 195 has a link 196 pivoted thereto adjacent its outer end, the link, in turn, being connected to the adjacent rear arm 155 by a link 197. The link 197 is pivoted to both the link 196 and the adjacent rear arm 155 and a stop member 198 is secured to the link 197 to engage the link 196 when the rail extension 195 has moved to its position in alignment with the corresponding one of the rails 156, 157 to prevent further downward movement of the extension.

For purposes which will be described hereinafter, it is desirable to sense the initial withdrawal of the pallet and, to this end, a limit switch 202 is fixed to the forward end of the rail 157 and has an actuating arm 203 which extends upwardly to be received in a recess 204 in the underside of the pallet. When the pallet is withdrawn, the actuator 203 rides out of the recess 204 to momentarily actuate the limit switch 202 to signal the initial withdrawal of the pallet.

When combining the pile on the auxiliary hoist with the pile on the main hoist, it is desirable to minimize the drop of the rear edge of the remnant pile as the pallet is withdrawn. This is because the suckers and the pile height detector operate on the rear edge of the pile and it is undesirable to have a drop such that the rear edge falls below the operating range for the suckers and the pile height detector. To enable the drop to be minimized, pallets have been provided with a step at the forward end thereof, as is shown in the drawings and as described in the aforementioned Royer application. The step comprises a thin portion 205 which extends along and outwardly of the front edge of the pallet and, when the pallet is withdrawn, the pallet is temporarily positioned with the portion 205 under the rear edge of the remnant pile and the main pile hoist operated to move the top of the pile thereon into the step and closer to the bottom of the rear edge of the remnant pile. The pallet then may be withdrawn and the remnant pile will only drop a distance approximately equal to the thickness of the narrow portion 205.

Figure 7:
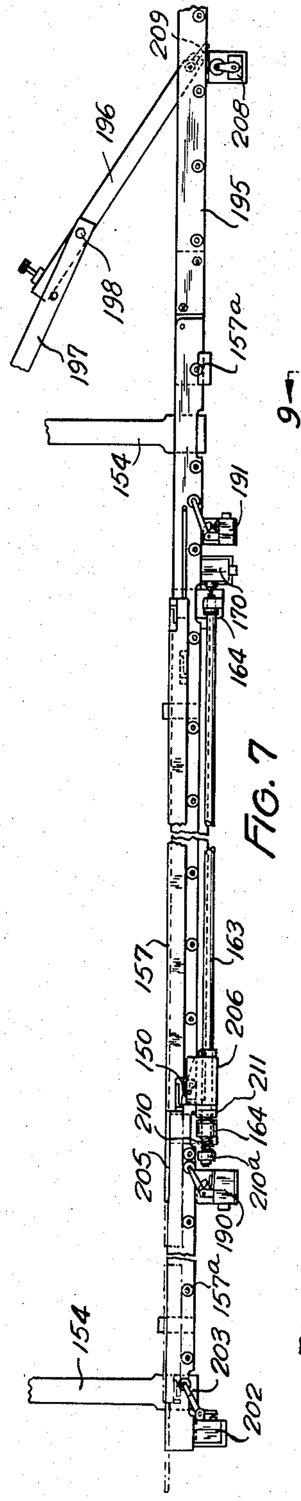
Fig. 7 is a sectional view taken approximately from lines 7—7 of Fig. 3.

The rail 157 carries the latch member 158 engageable in a recess in the underside of the pallet when the pallet is withdrawn to the position where the main hoist is to be lifted or raised. The latch member 158 on the rail 157 engages in the same recess 204 which receives the actuator 203 for the switch 202 when the pallet is fully disposed under the remnant pile. The latch member 158 is pivoted to a block 206 and is urged clockwise as shown in Figs. 7 and 8 about the pivot therefor by gravity aided by a spring 207 disposed under the left end of latch member 158 so that an upper portion 158*a* at the forward end thereof is urged upwardly into engagement with the underside of the pallet on the auxiliary hoist and toward movement into the recess 204. The upper forward portion 158*a* of the latch member forms an abutment which, when the recess 204 is moved to a position over the latch member, engages the forward side of the recess 204 which forms a cooperating abutment to prevent or arrest further withdrawal of the pallet. The block 206 is adjustably slidable along the rod 163 which extends along the underside of the rail 157 and which is supported for limited axial movement by the aforementioned front and rear blocks 164 disposed at the forward and rear ends of the bar 163 and fixed to the rail 157. The block 206 abuts an adjustable clamp collar 206*a* disposed rearwardly of the block. The bar 163 is normally urged forwardly by a spring 210 to move a collar 211 fixed thereto into engagement with the front block 164. The spring 210 is positioned between the front block 164 and a nut 210*a* fixed to the forward end of the rod 163. When the latch member 158 is engaged by the forward side of the recess 204, the force tending to withdraw the pallet and the momentum of the pallet cause the spring 210 to yield and permit limited rearward axial movement of the rod 163 to actuate a limit switch 170 mounted adjacent the rear end of rod 163 to signal that the latch member 158 has been received in the recess 204. The nut 210*a* is adjustable to provide proper preload in the spring 210 to both prevent friction from the underside of the pallet from urging the bar 163 rearwardly during withdrawal before the recess 204 comes into position, and also to prevent the two springs 210 from urging the pallet forwardly when only the thin portion 205 of the pallet is under the remnant pile.

After the latch member 158 is engaged and the new pile has been raised into the step provided in the pallet, the main hoist or the auxiliary hoist is operated to relatively move the remnant pile and the new pile on the main hoist toward each other to lift the forward portion 205 of the pallet. The lifting of the pallet or of the forward edge of the pallet causes the pallet to clear the latch member 158, allowing the spring 210 to return the rod 163 and signal the necessity to complete withdrawal of the pallet.

Preferably, a latch member and limit switch corresponding to latch member 158 and switch 170 may be provided on rail 156 together with a rod corresponding to rod 163 and the biasing means therefor. While a corresponding latch member is not shown, a corresponding limit switch 170' is shown in the circuit diagram. While the pallet is in its partially withdrawn position, it keeps the rear limit switches 191 actuated to provide a sensing of the fact that the pallet is still below the remnant pile. When the pallet is withdrawn fully, it clears the switches 191 and the operation thereof signals that the piles have been combined and switches pile raising control by the pile height detecting means to the main hoist only. After the pallet is withdrawn and removed from the rails 156, 157 and the extensions 195 thereof, the extensions are folded to their generally vertical position and a limit switch 208 is actuated by the swinging movement of the link 196 to signal that the arms 154, 155 should be swung out. The limit switch 208 is mounted adjacent the underside of the extension 195 of the rail 157 and is operated by a dog 209 secured to the end of link 196.

After the pallet has been withdrawn, the crank 160 is operated to swing out the arms 154, 155 of the auxiliary hoist. The shaft 162 of the crank 160 has switch actuating dogs 160*a*, 160*b* on its inner end and when the crank is operated, the dogs are adapted to actuate limit switches 212, 213 mounted on the frame member 161 adjacent the inner end of shaft 162 (see Fig. 13). The limit switches 212, 213 have actuators 212*a*, 213*a*, respectively, which, when operated in one direction by the passing of one of the dogs 160*a*, 160*b*, effect a momentary actuation of the switch, but when operated in the other direction, to not effect operation of the switch. The switches and actuators therefor are of a conventional commercially available type and therefore are not shown or described in detail. The switch 212 is set up so that the switch is momentarily actuated by the dog 160*a* when the crank 160 is rotated in a direction to swing the arms out. When the switch 212 is actuated momentarily, the auxiliary hoist motor 166 is operated to move the hoist downwardly in a continuous manner to a lower limit position where the hoist is adapted to take the next pallet to be elevated thereby from the main hoist. The downward movement of the auxiliary hoist is stopped when it reaches the desired lower limit by a limit switch 215 (Fig. 12) mounted adjacent the lower end of the front lead screw 151 adjacent the right-hand side of the pile elevating mechanism, as the latter is viewed in Fig. 3.

The limit switch 213 operated by the rotation of the crank 160 is set up so that the switch is momentarily actuated to a closed position by the dog 160*b* on the rotation of the crank in the direction necessary to swing in the arms. The actuation of the switch 212 causes the motor 166 to be energized to move the frame 150 upwardly at a continuous rate until the pallet is taken by the auxiliary hoist and the limit switches 190 or 191 are actuated. When one set of these switches is actuated, the continuous upward movement of the auxiliary hoist is stopped and, as described hereinbefore, the auxiliary hoist is placed under the control of the pile height detecting means.

The main hoist actuates a limit switch 216 (Fig. 15) to signal when the arms of the auxiliary hoist should be swung in to take a pallet from the main hoist. The limit switch 216 is supported on the front column 15 and is engaged by a vertical plate 217 fixed to the longitudinal rail 32 of the main hoist so as to move upwardly and downwardly therewith. Preferably, the limit switch 216 is actuated when the main hoist has been elevated to a position indicating that approximately seven inches of sheet pile remain thereon. The upward movement of the main hoist is limited by limit switches 218, there being such a limit switch mounted on each of the front columns 15, 16 in position to be actuated by the plate 217 on the longitudinal rail 32 and a plate 217*a* on the longitudinal rail 33 (see Fig. 3).

In the preferred embodiment, the operation of the pile elevating mechanism is facilitated and simplified by a control panel which includes signals for performing certain operations at the proper time. The control panel is designated by the reference numeral 220 and is mounted on the cover of the elevating mechanism at the rear side thereof. (See Figs. 1 and 18.) The control panel 220 includes a signal block 221 having a light 222 (Fig. 19*a*) therein which is energized when the arms of the auxiliary hoist are to be swung in to pallet-engaging position. The energization of the lamp 222 is controlled by the limit switch 216. Immediately below the block 221 on the control panel is a block 224 which indicates that the main hoist should be lowered when a lamp 225 therein is energized. The lamp 225 may be energized after the auxiliary hoist has taken the pallet from the main hoist and the energization of the lamp 225 is controlled by a limit switch 226 (Fig. 16) mounted on the front arm 154 of the auxiliary hoist on the left-hand side of the elevating mechanism, as viewed in Fig. 3, and by the limit switch 216 which is actuated by the main hoist when the pile thereon is to be taken by the auxiliary hoist. The limit switch 226 is a safety switch and is actuated by the pallet on the auxiliary hoist if the main hoist, with a pile thereon, is elevated so that it engages the pallet and lifts the same from the auxiliary hoist. If this happens, the limit switch 226 is operated and the "Lower main hoist" signal 224 energized. Immediately below the main hoist block is a "Pull pallet" block 228 which includes a lamp 229 which, when energized, indicates that the pallet should be pulled. The "Pull pallet" lamp 229 is energized under the control of a limit switch 231 disposed adjacent the lead screw 151 at the front left-hand corner of the auxiliary hoist, as the latter is viewed in Fig. 3. The limit switch 231 is actuated by the nut that coöperates with the adjacent lead screw when the nut has been elevated to a predetermined position. A block 233 is disposed immediately below the block 228 and is illuminated to indicate that the pallet on the auxiliary hoist has been withdrawn to a position where its thin forward portion 205 thereof is disposed under the rear edge of the remnant pile and that the hoists are to be operated to relatively move the hoists to lift the pallet from the latch members 158 prior to completing withdrawal of the pallet. The energization of the lamp 234 is controlled by the limit switches 170 and 170' responsive to the operation of the latch members for engaging the pallet. A legend block 236 is disposed on the main control panel 220 immediately below the legend block 233 and has a lamp 237 which is energized to indicate that the arms of the auxiliary hoist are to be swung out. The energization of lamp 237 is controlled by the limit switch 208 actuated by the raising of the rail extensions 195.

In addition to the above legend blocks, the control panel 220 includes "Raise" and "Lower" start buttons 238, 239, respectively, for the motor 166 and "Stop" button 240 for stopping the operation of the auxiliary hoist motor and a "Synchronize" push button switch 242 which is actuatable to render the pile height detecting means effective to control both the main and auxiliary hoists and a lamp 243 to indicate that both hoists are under the control of the detecting means, which may be termed "synchronization." The panel also includes "Power-on" and "Power-off" push button switches 244*a*, 244*b* for controlling the connection of the control circuit to the mains and a lamp 244*c* indicating when control power is on. The controls for the auxiliary hoist may be best understood by reference to the circuit diagram of Figs. 19, 19*a*.

The "Power-on" push button switch 244*a* (see Figs. 19, 19*a*), when depressed, effects energization of a "Power" relay coil 245 by connecting one side thereof to an L1 terminal of the secondary of a supply transformer having terminals labeled L1, L2. The other side of the relay coil 245 is connected directly to L2. The connection of the relay coil 245 to L1 is through the normally closed contacts of "Power-off" push button switch 244*b*. The energization of "Power" relay coil 245 closes its normally open contacts 245*a*, 245*b* and opens its normally closed contacts 245*c*. The contacts 245*a* complete a holding circuit across "Power-on" switch 244*a* and the closing of contacts 245*b* connects a line, hereinafter designated as L1*c*, to the terminal L1 of the transformer to supply power to the control circuit. It will be noted that the control power is killed and the "Power" relay coil 245 de-energized if "Power-off" push button switch 244*b* is operated.

When the "Raise" push button switch 238 is actuated, it closes two sets of normally open contacts 246*a*, 246*b*. The closing of the contacts 246*a* completes the circuit for energizing an "up" relay coil 247. When the "Lower" push button switch 239 is actuated, it closes normally open contacts 248 to effect energization of a "down" relay coil 250. The relay coils 247, 250 actuate contacts 247*a* and 250*a*, respectively, in the phases for energizing the motor 166 and, when closed, effect energization of the motor to cause it to rotate in different directions. In addition to the contacts 247*a*, 250*a*, the "up" relay coil 247 also has normally closed, interlocking contacts 247*b* in the circuit for energizing "down" relay 250 and normally open contacts 247*c* for making a holding circuit across "Raise" push button switch 238, and the "down" relay coil 250 has normally closed, interlocking contacts 250*b* in the circuit for energizing the "up" relay 247 and normally open contacts 250*c* which make a holding circuit across the "Lower" push button switch 239. When the "Raise" push button switch 238 is depressed, the contacts 246*a* thereof connect one side of the "up" relay coil 247 to L1*c* through a circuit which comprises the normally closed contacts of "Stop" push button switch 240, one of the normally closed contacts of switch 240 being connected to L1*c* and the other being connected to one of the contacts 246*a* of "Raise" push button switch 238 by a connection 252, and the other contact of the contacts 246*a* being connected to the "up" relay coil 247 through a connection which includes, in series, the intermittent switch 183, which is normally closed, and the interlocking contacts 250*b* of the "down" relay coil 250. The other side of the "up" relay coil 247 is connected to L2 by a connection 253 which includes the normally closed contacts 254*a* of a relay coil 254, and a normally closed upper limit switch 256. (See Fig. 12.) When the "up" relay coil 247 is energized, its contacts 247*c* complete a holding circuit about the "Raise" push button switch 238 as mentioned above. The "up" relay coil 247 will be maintained energized until either the intermittent limit switch 183, the high limit switch 256, the stop push button 240, or one of the interlocking contacts in the circuit is opened. It will be noted that a normally closed parallel circuit 257 is connected across the intermittent limit switch 183 and includes normally closed contacts 260*a* actuated by a "swing in" relay coil 260 and normally closed contacts 261*a* actuated by a "change-over" relay coil 261. The contacts 260*a*, 261*a* are normally closed, i.e., the relay coils 260, 261 are normally de-energized, when a pallet is not present on the auxiliary hoist, or the arms 154, 155 are not being swung in to take a pallet. Therefore, as long as a pallet is not on the auxiliary hoist or the auxiliary hoist arms are not being operated to take a pallet from the main hoist, the operation of intermittent limit switch 183 will not affect the energization of "up" relay coil 247.

The energization of the "swing-in" relay coil 260 by the momentary closing of the switch 213 as the arms of the auxiliary hoist are swung in also sets up a circuit to effect a raising of the auxiliary hoist to lift a pallet from the main hoist and to place the auxiliary hoist under the control of the pile height detector 100, when the pallet is lifted by the auxiliary hoist as signalled by the actuation of the limit switches 190 and the energization of "change-over" relay coil 261.

The momentary energization of "swing-in" relay coil 260 closes normally open contacts 260*b*, and in addition momentarily opens and again closes contacts 260*a*, previously mentioned, for effecting the energization of a relay coil 263 from L1*c*, the relay coil 263 actuating normally open contacts 263*a*, which, when closed, complete a circuit across the contacts of "Raise" push button switch 238 and effect energization of "up" relay 247. The circuit for energizing the relay coil 263 includes normally closed contacts 265*a* on the L2 side of contacts 260b actuated by a time-delay relay coil 265. The time-delay relay coil 265 is connected across its contacts 265*a* and the relay coil 265 is energized whenever relay 263 is energized and operates after a predetermined time delay of approximately one-half second to open the circuit for energizing relay coil 263 from L1*c*. It can be seen from the above, that as the arms of the auxiliary hoist are swung in, the relay coils 260 and 263 will operate to energize the "up" relay coil 247 to energize motor 166. When the "up" relay coil is energized, it will complete a self-holding circuit through its contacts 247*c* so that it will not be deenergized when the relay coil 263 is de-energized, and the auxiliary hoist will raise until the circuit for energizing coil 247 is broken. If, for some reason, the arms, 154, 155 are stopped in a position which maintains the switch 213 closed, the time-delay relay coil 265 will operate to de-energize the relay coil 263 to prevent repeated operation of the motor 166. While the intermittent switch 183 would be effective to de-energize the "up" relay in this condition, since the contacts 260*a* in the parallel connection 257 across the switch will also be open, the "up" relay coil could be again energized by pushing "raise" button 238 to close 246*a* and 246*b* to by-pass the circuits through switch 183 and lead 257. Under such condition, the auxiliary hoist can raise until switch 183 next opens after button 238 is released.

The "up" relay under normal conditions of transferring a pallet from the main to the auxiliary hoist will remain energized until the pallet closes both "pallet-sensing" switches 190 carried by the rails 156, 157. Each of the switches 190 has one of the switches 191 connected in parallel therewith and switches 190 are connected in series to complete a circuit when both are closed between L1*c* and one side of the "change-over" relay coil 261. The other side of the relay coil 261 is connected directly to L2.

The energization of change-over relay coil 261 opens the normally closed contacts 261*a* in the parallel connection 257 to render the intermittent switch 183 effective to de-energize the "up" relay coil 247 when operated by one of the dogs 181, 182 to stop the raising of the auxiliary hoist. It can be seen, therefore, that when the arms 154, 155 are swung in, the auxiliary hoist will raise until the pallet-sensing switches 190 are actuated to render intermittent switch 183 effective to de-energize "up" relay coil 247.

The "change-over" relay coil 261 also actuates normally open contacts 261*b* connected in a series connection with the pile height detector switch 180 and across the contacts 260*b* so that when both the contacts 261*b* and the pile height detector switch 180 are closed, the relay coil 263 and time-delay relay coil 265 are energized from L1*c* to effect energization of the "up" relay coil 247. During normal operation, the "up" relay coil will remain energized until the intermittent switch 183 effects its de-energization, as described above. It can now be seen that when a pallet is on the auxiliary hoist, the momentary closing of switch 180 will effect an incremental raising of the auxiliary hoist. Since the bell-crank lever 127 (Fig. 20) for operating switch 180 is capable of being reciprocated once in each cycle when the pile is low, the closing of the switch 180 is only momentary and it is opened in each cycle to de-energize relay coil 263 and if the pile is still low in the next cycle switch 180 will again close to again effect another incremental raising of the auxiliary hoist.

The relay coil 254 is a limit relay coil and has, as mentioned hereinbefore, normally closed interlocking contacts in the circuit for energizing "up" relay coil 247, the contacts being connected between the relay and L2. The "limit" relay coil 254 is energized in the event that the height of the pile raises above a maximum level. If this occurs, the top of the pile actuates a limit switch 270 (see Fig. 13) having normally open contacts to connect one side of the relay coil 254 to L1*c* and to effect energization of the latter to open the contacts 254*a* in the circuit for energizing the "up" relay 247. Similarly, it will be noted that if the auxiliary hoist reaches its upper limit, it will operate limit switch 256 (see Fig. 12) to also effect a de-energization of the "up" relay coil.

It will be noted that time delay contacts 265*a* will prevent repeated energization and de-energization of the motor 166 in the event the switch 180 is maintained closed.

Preferably, the "Raise" push button switch 238 has its contacts 246*b* connected to complete a circuit across the intermittent limit switch 183 and the parallel connection 257 so that the hoist can be raised under the control of the operator even though the change-over relay coil 261 is energized by the presence of a pallet on the auxiliary hoist and the intermittent switch 183 is open. To this end, the L2 side of the contacts 246*a* of the "Raise" switch 238 is connected to one of the contacts 246*b* and the other of the contacts 246*b* is connected to the intermittent switch 183 on the L2 side thereof. It can be seen that, whenever the push button switch 238 is depressed, a circuit will be completed to energize "up" relay coil 247 regardless of the condition of switch 183 or the parallel connection 257. After the "up" relay coil is energized, it will be apparent that the holding contacts 247*c* thereof will hold the circuit even though the limit switch 183 or its parallel connection 257 is open, as long as the push button switch 238 is held closed.

The above description has set out the control for the auxiliary hoist motor when it is desired to elevate the motor by depressing the push button switch 238 and when the motor is under the control of the pile height detecting means. The auxiliary hoist, however, may be lowered at any time, regardless of whether it is under the control of the pile height detecting means, by pushing the "Stop" switch 240 and then the "Lower" push button switch 239. As stated hereinbefore, the depression of this switch completes a circuit for energizing the "down" relay coil 250 and will effect energization of the "down" relay coil only if the "up" relay coil is de-energized, since the circuit for energizing the relay coil 250 includes interlocking, normally closed contacts 247*b* actuated by "up" relay coil 247. The circuit for energizing the "down" relay 250 may be traced on the circuit diagram from L1*c* through "Stop" push button switch 240, the connection 252, a connection 281 to one of the contacts of the push button switch 239 and a connection 282 from the other contact of the switch 239 to the L1 side of the relay coil 250 and from the other side of the relay coil to L2 through a connection including the lower limit switch 215. The energization of the "down" relay coil 250 closes its normally open contacts 250*c* in a parallel connection 284 about the push button switch 239 to provide a self-holding circuit which can be broken by opening lower limit switch 215 (see Fig. 12), or contacts 285*a* actuated with a time delay by a relay coil 285 and connected in series with contacts 250*c* in the connection 284. The time-delay relay coil 285 is energized to break the holding circuit through parallel connection 284 in a manner described hereinafter. The limit switch 212 (Fig. 13) is closed momentarily as the arms 154, 155 of the auxiliary hoist are swung out to initiate movement of the auxiliary hoist downwardly to its lower limit position determined by the position of the lower-limit limit switch 215. When the limit switch 212 is closed, it completes a circuit from L1*c* through the limit switch 212 to energize a "swung-out" relay coil 287. The relay coil 287 actuates normally open contacts 287*a* and normally closed contacts **287*b*. The normally open contacts 287*a* are connected in parallel across the "down" push button switch 239 and the parallel connection 284 and, when closed, connect the "down" relay coil 250 to L1*c* through the "Stop" push button switch 240**.

The "down" relay 250 for the auxiliary hoist may also be energized by the closing of contacts **290*a* actuated by a relay coil 290 which is connected in parallel with the relay coil 285. The relays 285 and 290** will be explained in more detail hereinafter.

The energization of the change-over relay coil 261 upon the taking of a pallet by the auxiliary hoist not only places the auxiliary hoist motor 166 under the control of the pile height detector, as described above, but also sets up circuits for controlling and indicating various operations which take place during the change-over from the main hoist to the auxiliary hoist and during the later combining of the piles on the auxiliary and main hoist. When the pallet is taken by the auxiliary hoist and the change-over relay coil 261 is energized, it closes contacts **261*c* in a connection 291 connected to L1*c* to connect L1*c* to a connection 292 which is connected through a connection 293 to one side of the solenoid 145 (Fig. 6) for lifting the pawl 84 clear of the ratchet wheel 90 to remove the main hoist from the control of the pile height detector. The connection 293 to the solenoid 145 includes normally open contacts 295*a* actuated by a relay coil 295 which is energized on the closing of the contacts 261*c* of the change-over relay coil 261. The relay coil 295 is connected to the connection 291, including the contacts 261*c* of the change-over relay coil, and then to L1*c* by a circuit which includes the normally closed contacts 297 of the "Synchronize" push button switch 242 connected in series with normally open contacts 298*a* actuated by a relay coil 298, having normally open contacts 295*b* being connected in parallel with contacts 298*a*. The normally open contacts 298*a* are closed to energize relay coil 295 and, in turn, solenoid 145 when the relay coil 298 is energized, the latter coil being energized by the closing of the change-over relay contacts 261*c* through a circuit which includes normally closed contacts 299*a* actuated with a time delay by a relay coil 299. The relay coil 298 is, therefore, normally energized as soon as connection 292 is connected to L1*c*. The circuit for energizing relay coil 298 from the time delay contacts 299*a* comprises a connection 301 which includes the normally closed contacts 302*a* of a relay coil 302. The relay coil 299, as stated above, is a time-delay relay and the circuit for energizing the relay coil 298 through the contacts 299*a* is broken a predetermined time after it is made by the operation of the time-delay relay coil 299 and which is energized simultaneously with the relay coil 298 upon closing of the contacts 261*c*. Summarizing, the energization of relay coil 298 closes its normally open contacts 298*a* in the circuit for energizing relay coil 295 and the energization of relay coil 295 closes its normally open contacts 295*a* in the circuit for energizing the solenoid 145 to lift the pawl clear of the ratchet wheel 90 and to release the latch lever 80**.

When the relay coil 295 is energized to energize solenoid 145, it closes its holding contacts **295*b* to complete a self-holding circuit about the contacts 298*a* of the relay coil 298. The energization of the relay coil 295 also closes normally open contacts 295*c* in the energizing circuit for a relay coil 302. The contacts 295*c* and the relay coil 302 are series connected across the time-delay relay 299 and when the relay coil 295 operates it closes the contacts 295*c* to effect energization of the relay coil 302 from connection 292. The operation of relay coil 302 opens its normally closed contacts 302*a* in the circuit for the relay coil 298 to de-energize the latter and open its contacts 298*a*, 298*b*. The contacts 298*a* are in the circuit for energizing the coil 295, while the contacts 298*b* are connected in parallel with the time-delay contacts 299*a* of the relay 299. The contacts 298*b* will assure that the opening of the contacts 299*a* does not de-energize relay coil 298 before relay coil 295 is energized to lift the pawl 84. If the contacts 299*a* were opened before the relay coil 298 were energized to close its contacts to energize the relay coil 295 to, in turn, close contacts to energize the solenoid 145**, the sequence of operations would not occur and the pawl would not be lifted.

In the preferred and illustrated mechanism, an alarm sounds and a light is illuminated, either continuously or in an intermittent manner, under each of the conditions when the arms of the auxiliary hoist are to be swung in to take the pallet from the main hoist, when the pallet is to be initially withdrawn to its position where the thin portion 205 thereof is disposed under the rear edge of the pile, when the pallet is lifted clear of the latch members upon relative movement between the hoists and the pallet is to be completely withdrawn from the auxiliary hoist, and when the arms of the auxiliary hoist are to be swung out after the withdrawal of the pallet.

When the main hoist reaches a predetermined elevation, it actuates switch 216 (Fig. 15). The limit switch 216 is a normally open switch and, when actuated, closes is contacts to energize a relay coil 308 for actuating normally open contact **308*a*, 308*b* which are closed when the relay coil is energized. The closing of the contacts 308*a* completes a circuit from L1*c* for energizing a relay 310. The contacts 308*a* are connected in series with a switch 312 (Fig. 2) mounted on the auxiliary hoist frame 150 and engaged by one of the arms 154, 155 thereof and actuated to a closed position when the arms are swung out, and opened as the arms are swung in. When the main hoist reaches a position where the pallet is to be taken therefrom, the arms of the auxiliary hoist are in their out position and the limit switch 312 is closed so that the relay 310 will be energized when the contacts 308*a* are closed. Energization of the relay 310 closes normally open contacts 310*a* which completes a circuit from L1*c* to energize a flasher relay coil 315 and an alarm 313 and a lamp 314 through contacts 315*a* of flasher relay coil 315 and its contacts 310*b* to energize lamp 222 in the control panel 220. The flasher contacts 315*a* make and break when the coil and contacts are energized and the alarm and lamp will operate intermittently. The relay 310 will keep the alarm 313 sounding and the lamp 314 flashing intermittently until the arms are swung in and the switch 312 is opened to drop out relay coil 310. After the arms have been swung in, the relay coil 263 will operate to effect a continuous "up" movement of the auxiliary hoist in the manner described above and the movement will be stopped when the hoist has taken the pallet from the main hoist. As hereinbefore mentioned, when this happens, the closing of the front switches 190 on the rails 156, 157 will effect an energization of the change-over relay 261**.

After the pallet is taken by the auxiliary hoist, light 225 in the control panel 220 will be energized to indicate that the main hoist should be lowered. The light 225 is energized by the energization of a relay coil 318 having contacts **318*a* connecting the light 225 to L1*c*. One side of relay coil 318 is connected to L2 and the other side to L1*c* by a connection which includes the normally open contacts 308*b* actuated by the relay coil 308 and normally open contacts 261*d* actuated by the relay coil 261. As will be recalled, the taking of the pallet by the auxiliary hoist effects an energization of the change-over relay coil 261 to close its normally open contacts, and the limit switch 216 (Fig. 15) which is actuated when the main hoist reaches the position for taking the pallet therefrom effects the energization of the relay coil 308 to effect the closing of its contacts 308*b*. Therefore, when the main hoist takes the pallet, the relay coil 318 is energized to close its contacts 318*a* to connect the light 225 across L1*c* and L2 to indicate that the main hoist should be lowered and a new pile brought into position and its contacts 318*b* to energize flasher relay 315 and alarm 313** to L1*c*. As soon as the main hoist is lowered sufficiently to open the limit switch 216, the relay coil 308 and, in turn, the relay coil 318 will be de-energized to open the contacts 318*a*, extinguishing the light 225, the alarm 313, and the flasher lamp 314.

After the main hoist is lowered and a new pile brought into position thereon, the main hoist is elevated to position the top of the new pile immediately below the bottom of the pallet on the auxiliary hoist, preparatory to combining the piles when the remnant pile on the auxiliary hoist is depleted to a predetermined level. After the new pile has been properly positioned with its top immediately below but not touching the pallet on the auxiliary hoist, it is desirable to operate both hoists under the control of the pile height detector, or in synchronism with each other, until the pile on the auxiliary hoist is depleted sufficiently to where the piles on the main and auxiliary hoists are to be combined. The hoists may be synchronized so that the pile height detecting means will effect incremental operation of both by depressing the "Synchronize" push button 242. When the "Synchronize" push button switch 242 is actuated, it opens its contacts 297 to de-energize the relay coil 295. It will be recalled that the relay coil 295 was energized by the taking of the pallet by the auxiliary hoist to effect energization of the solenoid 145 for lifting the pawl 84 clear of the ratchet wheel 90. When the circuit to the relay coil 295 is broken, the solenoid 145 is de-energized and the pawl 84 is then placed under the control of the pile height detector, as described above, and the pawl is operated to raise the main hoist in increments together with the auxiliary hoist. The actuation of the "Synchronize" switch 242 to break the circuit for energizing relay 295 also closes its normally open contacts 320 which complete a circuit from L1*c* through the now closed, normally open contacts 261*d* of the relay coil 261 to energize a relay coil 322 having normally open contacts 322*a* and 322*b*. The normally open contacts 322*a* complete a holding circuit for holding the relay 322 energized and are connected in parallel with the contacts 320 of the "synchronize" switch 242 and the contacts 322*b* complete a circuit for connecting the lamp 243 across L1, L2. The lamp 243 indicates that the hoists have been synchronized and that the pile height detector will effect an incremental operation of both hoists when it detects a low pile level.

When the pile on the pallet on the auxiliary hoist is depleted to preferably approximately 1½ inches, the limit switch 231 (Fig. 3) will be actuated by the auxiliary hoist. The closing of the limit switch 231, completes a circuit for energizing a relay coil 325 from L1 through a circuit including the now closed contacts 261*d* of the energized change-over relay 261, normally closed contacts 326*a* actuated by a relay coil 326 and in a connection 327, the now closed contacts of limit switch 231, and a connection 328 including the normally closed contacts 330*a* which are actuated by a relay coil 330. The energization of the relay coil 325 upon closing of the limit switch 231 closes its normally open contacts 325*a*, 325*b*. The normally open contacts 325*a* are holding contacts which complete a holding circuit across the limit switch 231 and the contacts 330*a* of the relay coil 330, while the contacts 325*b* are in a circuit for energizing a relay coil 322 and when closed, connect one side of the relay coil 322 to L1*c* through the connection 327, including normally closed contacts 326*a* and the now closed contacts 261*d* of change-over relay coil 261. The energization of the relay coil 332 closes contacts 332*a* and 332*b*. The contacts 332*a* are in a circuit for connecting the L1 side of the alarm 313 and the lamp 314 to L1*c* independently of the flasher contact 315*a* and when closed, effect a continuous energization of the alarm 313 and the lamp 314.

The contacts 332*b* of the relay coil 332, energized as just described, effect, when closed, energization of the lamp 229 indicating that the pallet should be pulled and are connected in a circuit in series with normally closed contacts 326*d* of the relay coil 326. Therefore, with the relay coil 326 de-energized, the normal condition of the relay, the energization of the relay 332*b* illuminates the pull pallet lamp 229.

When the pallet is pulled to a position where only the thin portion 205 thereof is disposed under the rear edge of the remnant pile on the auxiliary hoist, the latch members 158 engage and close the limit switches 170, 170′. Before, however, the limit switches 170, 170′ are actuated, the initial withdrawal of the pallet momentarily closes the limit switch 202 disposed adjacent the front end of the rail 157 to signal the initial withdrawal of the pallet. The closing of the limit switch 202 energizes a relay coil 336 having normally open contacts 336*a*, 336*b* and 336*c*. The contacts 336*a* are connected in parallel with the series circuit comprising contacts 325*a* and the switch 231 actuated by the main hoist when it reaches the level for pallet removal to maintain the alarm and lamp 314 energized continuously when the circuit through the limit switch 231 is broken. Or, if the pallet is withdrawn prior to the main hoist reaching its proper height, the contacts 336*a* will effect the energization of the relay 325 and, in turn, the relay 332 to close the contacts 332*a* and to sound the alarm 313 continuously. The circuit through limit switch 231 is broken by the closing of the contacts 336*b* upon operation of switch 202 since these contacts are connected into a circuit for energizing the relay coil 330 from L1*c* through the normally open contacts 261*d* of the change-over relay 261. The relay coil 330, when energized, opens its normally closed contacts 330*a* in series with the switch 231 in the circuit for energizing the relay 325. The closing of the normally open contacts 330*b* of the relay coil 330 effects a holding circuit for the relay 330 around the contacts 336*b* so that relay coil 336 can be de-energized without affecting relay coil 330.

When the pallet is withdrawn sufficiently to engage the pallet latch members 158, the limit switches 170, 170′ are closed to effect energization of the relay coil 326 from L1*c* through the now closed, normally open contacts 261*d* of the change-over relay 261. The energization of the relay coil 326 opens its normally closed contacts 326*a* to de-energize the relay coils 325 which have been operating through relay coil 332 and its contacts 332*b* to maintain the "Pull pallet" light 229, the alarm 313, and the light 314 continuously energized. In addition to the contacts 326*a*, the relay coil 326 has contacts 326*b* which are normally closed in the circuit for energizing the "Pull pallet" light and these contacts are also opened to de-energize the "Pull pallet" lamp.

The relay coil 326 also actuates contacts 326*c* which are closed when the coil is energized to energize a relay 338 from L1*c* through the now closed, normally open contacts 261*d* of the change-over relay 261. The relay coil 338 has normally open contacts 338*a* which make a self-holding circuit about the contacts 326*c*, and normally open contacts 338*b* which are connected in parallel with the contacts 332*a* for completing a circuit for maintaining the alarm 313 and the light 314 in a continuously energized condition while the remainder of the combining operation is taking place, it being recalled that the relay 332 is de-energized by the opening of the contacts 326*a*. The relay coil 338 also actuates normally open contacts 338*c* connected in parallel with the contacts 332*b* in the circuit for energizing the "Pull pallet" lamp 229 so that the lamp will again be energized upon the de-energization of relay coil 326 when the latch switches 170, 170′ are opened and remain energized as long as the relay coil 338 remains energized. If it were not for the contacts 338*c*, the light would go out when the relay 326 is de-energized upon the release of the latch members 158 and the opening of the switches 170, 170′.

The relay coil 326 which was energized by the engagement of the pallet with the latch members also actuates contacts **326*d* in a connection for energizing the lamp 234 which indicates that the main hoist should be raised or the auxiliary hoist lowered to combine the piles. The closing of the contacts 326*d* effects the energization of this light. When the lamp 234 is illuminated, the main hoist is raised until the rear of the new pile engages portion 205 of the pallet, and may be raised additionally or the auxiliary hoist may be lowered until the top of the pile on the main hoist lifts the pallet clear of the latch members 158, extinguishing lamp 234**.

It will be noted that with the latch members 158 engaged and switches 170, 170′ closed, and relay coil 326 energized, contacts **326*g* in the circuit for energizing relay coil 290 and time-delay relay coil 285 are closed so that when the "Lower" push button switch 239 is actuated, these coils (290, 285) are energized. The energization of relay coil 285 immediately opens the normal holding circuit for "down" relay 250, but relay coil 290 closes its contacts 290*a* to complete a holding circuit which is only maintained until relay coil 326 is de-energized upon release of the latch members when the pile in the main hoist engages the thin pallet step and lifts the front edge of the pallet vertically to drop out coil 290 and coil 285. The contacts 285*a* close with a time delay to assure that contacts 290*a* are open and relay 250 de-energized when the contacts 285*a*** close.

When the latch members 158 are cleared, the switches 170, 170′ open and the relay coil 326 is de-energized causing the opening of its normally open contacts and the closing of its normally closed contacts, including the contacts **326*d* in the circuit for energizing the "Pull pallet" lamp 229. The opening of contacts 326*g* in the circuit for effecting energization of relay coil 290 and, in turn, "down" relay coil 250, assures that the downward movement of the auxiliary hoist will stop after the latch members are cleared and prevent hanging up of the pallet lip on the new pile. When the contacts 326*d* close, the "Pull pallet" lamp 229 is energized since the relay coil 338, originally energized by the actuation of relay coil 326, is maintained in an energized condition by its holding circuit and its normally open contacts 338*c* in the circuit for energizing the "Pull pallet" lamp 229 remain closed. When the pallet is completely withdrawn, none of the switches 190, 191 will be closed and the relay 261 will then be de-energized. During the withdrawal operation, one of the sets of switches 190, 191 will always be in the closed position since before the withdrawal, the front switches 190 will be closed and as long as the pallet has the rear edge disposed beneath the rear edge of the remnant pile, the switches 191 will be closed. On complete withdrawal, however, the switches are opened and the change-over relay 261 is de-energized which opens the contacts 261*d*, 261*c*, de-energizing all the relays which are connected to L1*c* through these contacts, including the relay coil 338. The de-energization of the latter coil de-energizes the alarm 313 and the lamp 314 by opening contacts 338*b***.

After the pallet has been withdrawn completely and removed from the rails and their extensions, the extensions are folded up which effects a momentary closing of the limit switch 208. This energizes a relay coil 340 from **L1*c* through the switch 208 and normally closed contacts 287*b* of the relay coil 287. The energization of relay coil 340 closes its normally open contacts 340*a* to complete a self-holding circuit around the switch 208, its contacts 340*b* connected in parallel with the contacts 310*a* to complete a circuit to energize the alarm 313 and lamp 314 from L1*c* through the contacts 315*a* of flasher 315, and its contacts 340*c* to energize lamp 237. This indicates that the arms of the auxiliary hoist are to be swung out. As the arms swing out, the limit switch 212 is momentarily actuated to energize the relay coil 287. The energization of relay coil 287 effects a continuous "down" operation of the auxiliary hoist in the manner described above through contacts 287*a* and the opening of its normally closed contacts 287*b* in the circuit for energizing the relay coil 340 causes de-energization of this latter relay and the opening of its contacts 340*b*** to terminate the alarm and light.

In the preferred and illustrated embodiment, extra floating air is supplied during pallet withdrawal. In the type of pile elevating mechanism under consideration, and the sheet-separating mechanism associated therewith, floating air is normally delivered between the top sheets of a pile by a plurality of air nozzles 345 distributed along the rear edge of the pile and including nozzle for supplying extra floating air as described in application Ser. No. 702,604, filed December 13, 1957, by Thomas J. Elliott and Sherman S. Watts. At the time that the pallet is to be withdrawn, it is desirable to supply additional air since the forward edge of the remnant pile will drop as the pallet is withdrawn from its pile-supporting position. A solenoid valve 346 is mounted above the rear edge of the pile and, when operated effects an additional supply of air to the air nozzles 345. The valve 346 is in a line between a pump and the nozzles 345. The solenoid valve 346 (Fig. 10) includes a solenoid 347 which is energized by a circuit including a switch 348 which is closed once during each cycle of the sheet-separating mechanism. The switch 348 has an actuator 349 which is operated by a cam 350 fixed to the shaft 105 and in each revolution of the shaft 105 the switch 348 is closed for a predetermined portion thereof to permit the extra floating air to be supplied from the pump to the nozzles. The circuit for energizing the solenoid 347 is shown on the circuit diagram. The solenoid 347 is connected to L2 by a direct connection and to **L1*c* through a circuit connection which includes the normally open contacts 261*d* of the change-over relay coil 261, the normally open contacts 326*e* of the relay coil 326, and normally open contacts 351*a* of a relay 351 connected in parallel with the contacts 326*e*, and the switch 348. The closing of the limit switch 348 will effect a supply of extra floating air in the event that either the contacts 326*e* or the contacts 351*a* are closed after the closing of the contacts 261*d* by the taking of a pallet by the auxiliary hoist. It will be recalled that the contacts 261*d* are closed by the actuation of the limit switches 190 or 191 when the auxiliary hoist takes a pallet from the main hoist and the relay coil 326 is energized when the pallet latch is engaged during the withdrawal of the pallet, consequently the extra floating air will be supplied while the pallet latch is in engagement with the pallet. The relay coil 351 is energized by the operation of the relay coil 336 which is energized upon the closing of limit switch 202 during initial pallet withdrawal. The relay coil 336 actuates contacts 336*c* which, when closed, connect the relay coil 351 to L1*c* through the normally closed contacts 326*f* of relay coil 326 and the normally open contacts 261*d* of the change-over relay 261. Inasmuch as the relay coil 326 is de-energized until the pallet latch is engaged, the initial withdrawal of the pallet will effect energization of relay coil 351 to supply extra floating air. The energization of the relay coil 351 will also close its normally open contacts 351*b* to complete a holding circuit around the contacts 336*c* so that the relay coil 351 will remain energized until the relay coil 326 is de-energized to open the contacts 326*f* when the pallet is clear of the latch member. It can now be seen that extra floating air is supplied from the time that the limit switch 202 is actuated during initial pallet withdrawal until the limit switch 170 is returned to its normal condition after the pallet has cleared the latch members 158**.

The control circuit for the mechanism is arranged so that the main hoist may be lowered at any time. The main hoist can be raised or lowered, as described hereinbefore, by operation of the clutch control lever 74. When the clutch control lever 74 is shifted in one direction, the clutch mechanism 62 is operated to effect operation of the main hoist in one of its directions and when the clutch lever 74 is shifted in the other direction, the clutch 71 actuates the main hoist in the opposite direction. To shift the clutch lever 74, the latch lever 80 must be raised manually if it has not been raised by the energization of the solenoid 145. It will be recalled that the solenoid 145 is energized when the switches 190 are closed by a pallet on the auxiliary hoist. The solenoid 145 may also be energized by closing a switch 360. The switch 360 is mounted, as described hereinafter, and the closing thereof will effect energization of a relay coil 361 having contacts **361*a* for connecting the connection 292 to L1 when the contacts 361*a* are closed. It will be recalled that the connection 292 when connected to L1 effects energization of the solenoid 145 through the operation of relays 298 and 295. The energization of the solenoid 145 operates so as to prevent the pawl 84 from engaging the ratchet wheel and releases the latch lever 80 to free the clutch lever 74**.

If, however, the above control circuit is operating in its synchronized condition wherein the main hoist and the auxiliary hoist are both under the control of the pile height detecting means, the mere connecting of connection 292 to L1 will not effect energization of the solenoid 145. Contacts **295*a* will be open in this condition. It will be recalled that when the hoists are synchronized, relay coil 295 is de-energized, but also that the time-delay relay coil 299 is energized through normally closed contacts 261*c* of the change-over relay 261 and its contacts 299*a* in the circuit for effecting energization of relay coil 298 and, in turn, coil 295 when L1 is applied to connection 292 are open. The relay coil 361 is provided, therefore, with normally open contacts 361*b* connected in parallel across the synchronize switch 242 and, more particularly, in parallel with the normally closed contacts 297 thereof. In the event that the circuit is operating in a synchronized condition, the closing of contacts 361*b*, 361*c* will effect the energization first of the relay coil 298 by reason of the contacts 361*c* and then the energization of relay coil 295, upon the closing of contacts 298*a* through the contacts 298*a* and the contacts 361*b*. This will then effect a closing of the contacts 295*a* of the relay coil 295 to energize the solenoid 145**.

It can now be seen that, once the solenoid 145 is actuated through closing of switch 360 to prevent control of the main hoist by the pile height detector, the motor 51 can operate to effect the raising or lowering of the main hoist, either through clutch control lever 74 or through a handle 390 as will be described hereinafter.

It is possible that while the main hoist is being raised by the operator with the clutch actuating lever 74 or the operating handle 390, the top of the pile on the main hoist might engage a pallet on the auxiliary hoist and lift the pallet and pile thereon from the rails 156, 157. If this happens, switch 226 (Fig. 16) supported on one of the front arms 154 will open, this switch normally being held in a closed position by a pallet on the rails. If the pallet is lifted, the switches 190, will also open to de-energize the change-over relay coil 261. The de-energization of the change-over relay coil 261 and the closing of the limit switch 226 will complete a circuit for energizing relay coil 365 having contacts **365*a* parallel with contacts 310*a*, 340*b*, which effect energization of the alarm 313 and lamp 314 through the flasher contacts 315*a* when closed to operate the alarm intermittently and contacts 365*b* which are closed to energize lamp 225. The circuit for energizing relay coil 365 to effect operation of the alarm and the energization of the lamp 314** intermittently may be traced from L1*c* through normally closed contacts **261*f* actuated by the relay coil 261, the now closed switch 226, and normally closed contacts 366*a* of a relay coil 366. The contacts 366*a* of the relay coil 366 are closed as long as the relay coil 260, which is momentarily energized by the switch 213 as the auxiliary hoists are swung in, is de-energized. During normal operation, the relay coil 366 prevents the relay coil 365 from being energized by the closing of switch 226 by the pallet when the auxiliary hoist is being raised to take the pallet from the main hoist. When this operation is occurring, the relay coil 260 will have been energized momentarily by the swinging in of the arms of the auxiliary hoist to close its contacts 260*c* connecting relay coil 366** to L1*c* through the change-over relay contacts **261*f*. The momentary closing of the contacts 260*c* will energize the relay coil 366 to open its contacts 366*a* in the circuit for energizing relay coil 365 upon operation of the switch 226 and will close its contacts 366*b* to make a self-holding circuit for the relay coil 366 which is broken only when the pallet is lifted from the main hoist and the change-over relay coil 261 is energized to open its contacts 261*f*. It can be seen, therefore, that the closing of the switch 226 before the energization of the change-over relay coil 261 when the auxiliary hoist is operating to take a pallet from the main hoist will not affect energization of the relay coil 365** to signal a lowering of the main hoist.

Attention is directed to the fact that whenever the main hoist is to be lowered by the reason of the fact that the hoist has been elevated too far and has lifted the pallet from the auxiliary hoist and actuated the limit switch 226, or by reason of the fact that the main hoist has been elevated to a level where the pallet is to be transferred to the auxiliary hoist or the arms of the auxiliary hoist are to be swung out, the alarm is sounded intermittently. Whenever the pallet is to be pulled, either in the initial stage of withdrawal or the final stage of withdrawal, the alarm sounds continuously.

Attention is also directed to the fact that the Power-On-Off relay coil 245, when de-energized, kills the above described control circuit, with the exception that the closing of the switch 360 (Fig. 1) will be effective to energize the solenoid 145 to lift the pawl 84. This is because the switch 360 and the relay 361 are connected directly across L1, L2 rather than across L1*c*, L2 and the contacts **361*a* connect L1 directly to the connection 292 for operating the relays 295, 299, 298 and 302 in a manner to effect a lifting of the pawl. This is important since the motor 51 is not energized through the above-described control circuit, and during operation of the pallet elevating mechanism it is desirable to be able to raise the main hoist to an elevation where the sheets on a pallet supported on the main hoist can be removed from the main hoist with the transferring of the pallet to the auxiliary hoist. The circuit for energizing the motor 51 is shown as connected across L1, L2 and includes a motor contactor relay 370 which is energizable from L1 through a holding circuit having contacts 245*c* connected in parallel with main hoist safety limit switches 218 and self-holding contacts 370*a*. If the power-on button 244*a* is depressed to energize the described control circuit, the contacts 245*c* open, making the limit switches 218 effective to limit the upward travel of the main hoist by operation of the motor 51. If, however, the control power is off, the normally closed contacts 245*c* are closed enabling the main hoist to be operated past the main hoist safety switches 218. In this condition, a safety is provided by the pile-actuated, high limit safety switch 270 (Fig. 14) which has back contacts 270*a* connecting relay coil 370** to L2 and which open when the switch is closed.

In the type of elevating mechanism described, it is desirable to have backstops which engage the rear edge of the remnant pile when the pallet is being withdrawn. In Fig. 21 such a backstop is shown supported above the rear edge of the pile, it being understood that one or more of these backstops could be used. The backstop comprises a generally vertical backstop member 400 supported in an arm 401 for vertical sliding movement. The arm 401 is movably guided by a bracket 402 and can be reciprocated between a position where the member 400 is in engagement with the rear edge to a position clear of the rear edge of the pile. A solenoid 405 is provided for reciprocating the arm and has an armature 406 connected to a link 407 pivoted to the bracket 402 to reciprocate the latter, the link 402 being pivotally connected to reciprocate the arm 401 to move the member 400 into and out of position. The solenoid 405 is connected in parallel with the "Pull pallet" light 229 so that, whenever the "Pull pallet" light 229 is energized, as described above, the solenoid 405 is energized to move the backstop to its position in engagement with the rear edge of the remnant pile. The backstop is slidably supported in its arm so that it can move upwardly with the pallet and pile on the auxiliary hoist while it is in engagement with the rear edge thereof.

Summarizing the operation of the disclosed and described pile elevating mechanism, when the first pile is brought into position on the main hoist, the main hoist is operated under the control of the pile height detecting means and the ratchet wheel 90 and pawl 84 to maintain the top of the sheets on the main hoist at the level necessary for the proper operation of the separating suckers 11. After the main hoist has been elevated sufficiently to actuate limit switch 216, the alarm sounds intermittently and the operator receives a signal to swing in the arms of the auxiliary hoist. As the arms of the auxiliary hoist are swung in, the switch 213 is operated to effect a raising of the auxiliary hoist to lift the pallet from the main hoist and, when the pallet is lifted and actuates switches 190, the pile height detecting means is connected to control the auxiliary hoist to raise the latter incrementally to maintain the top of the pile thereon at the proper level. The switches 190 also effect energization of solenoid 145 to lift latch lever 80 and pawl 84. The main hoist is then lowered by operating either the clutch control lever 74 or the operating handle 390 which have been released by operation of solenoid 145 and as the switch 216 is opened, the alarm stops and the lower hoist signal is de-energized. When the main hoist has been lowered, the operator brings a new pile into position on the main hoist and immediately operates the main hoist through the clutch control lever 74 or handle 390 to raise the hoist to a position where the top of the pile thereon is immediately under and in close proximity to the bottom of the pallet on the auxiliary hoist. When the pile on the main hoist is disposed with the top thereof immediately below the pallet on the auxiliary hoist, the "synchronize" switch 242 is actuated to place both the main hoist and the auxiliary hoist under the control of the pile height detecting means 100. Inasmuch as the drums for the cables of the main hoist are narrow drums and the cables wind upon themselves, the main hoist at the time that the "synchronize" button is depressed is preferably positioned so that the top of the pile thereon is just a little below the pallet so that, as the effective diameter of the drums increases, the additional amount that the main hoist is raised in proportion to the amount that the auxiliary hoist is raised will not effect a closing of the gap and a pinching of the top sheet of the new pile against the pallet on the auxiliary hoist. Preferably, the hoists are designed so that the hoists will have an almost equal amount of movement when the main hoist is in the position that it would occupy with a new pile thereon and with the top thereof just below the pallet on the auxiliary hoist and with approximately four inches of sheet pile left on the auxiliary hoist.

When the sheet pile on the auxiliary hoist has been depleted to a predetermined point, preferably to about 1½", the auxiliary hoist actuates limit switch 231 which causes the alarm to sound continuously to signal the withdrawal of the pallet. The pallet is then withdrawn until the latch members 158 engage to arrest the continued withdrawal of the pallet. The initial withdrawal movement of the pallet is sensed by switch 202 which operates to maintain the alarm sounding and to effect the supply of additional floating air and to position backstop means, if provided, against the rear edge of the remnant pile. The switches 170 sense the engagement of the latch members and effect the actuation of the lamp 234 which signals that the main hoist should first be raised to the bottom of thin pallet portion 205 and then the hoists should be moved relative to each other to lift the pallet clear of the latch members 158. When the latch members are cleared, the signal for pulling the pallet is again energized and the alarm sounds continuously until the withdrawal of the pallet is completed. When the withdrawal is completed, the limit switches 191 open, the solenoid 145 is de-energized, and the pile height detector is connected to control only the main hoist. The pallet is removed and the rail extensions 199 are then swung upwardly, actuating the switch 208 to effect a signalling that arms of the auxiliary hoist should be swung out. When the arms of the auxiliary hoist are swung out, limit switch 212 is actuated to effect a continuous down movement of the auxiliary hoist until the hoist is positioned in its lower limit position where it is adapted to subsequently take the raised pallet from the main hoist. The down movement of the auxiliary hoist is terminated by operation of limit switch 256.

It will be noted that the main hoist may be lowered at any time that switches 190, 191 are closed through the operation of clutch lever 74, since the solenoid 145 is energized and the latch member 80 is lifted to a release position. The lever 74 can be actuated at other times by manually lifting the latch lever 80.

Figure 5:
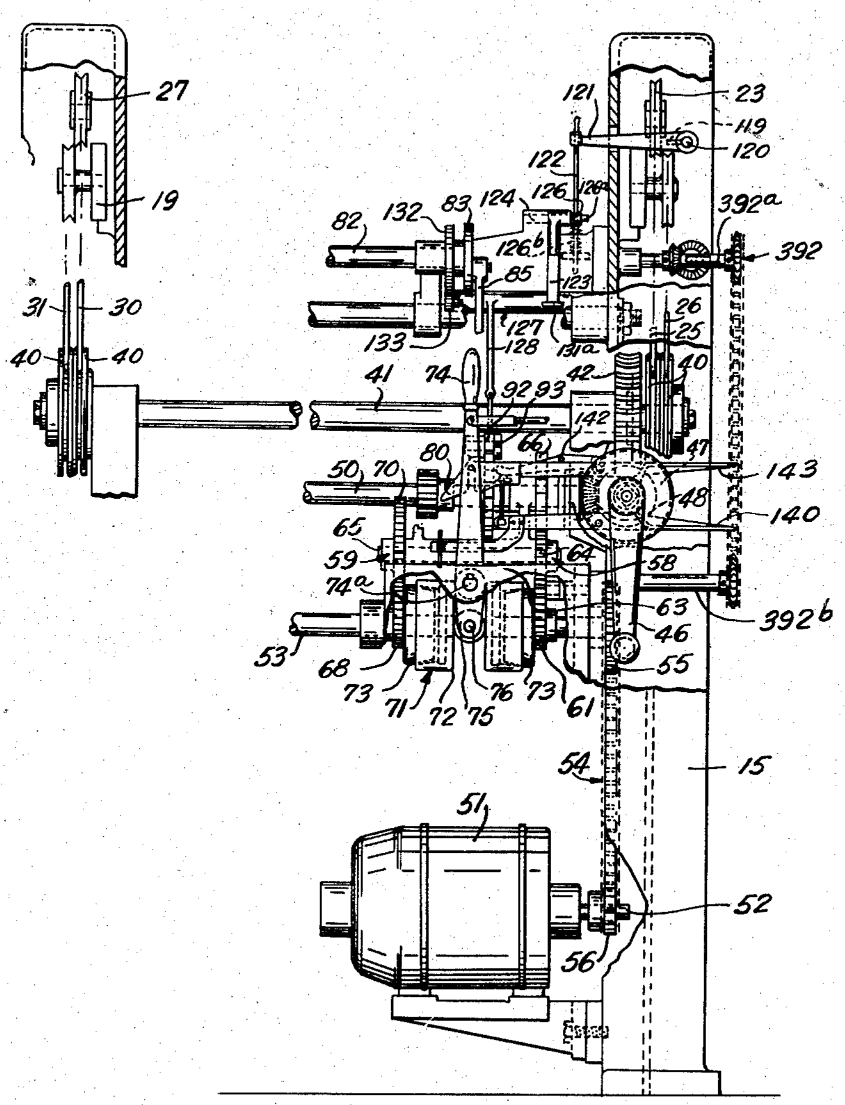
Fig. 5 is a fragmentary elevational view with parts cut away and removed taken from the left-hand side of Fig. 1.

It is desirable to be able to operate the clutch 74 from the rear of the elevating mechanism and, to this end, the operating handle 390 (Fig. 1) is fixed to the rear end of a shaft 391 journaled in the rear upright 17 adjacent the side frame member 18 and extending to the front of the elevating mechanism and connected through a drive 392 (Fig. 5) including shafts **392*a*, 392*b* to effect rotation of the shaft 74*a* to which the clutch lever 74 is fixed so that the handle 390 may be swung to rock the shaft 74*a*. The handle 390 includes a handgrip portion with a depressible or squeeze member 394. The member 394 is depressible against a spring bias and when depressed operates the limit switch 360 through a linkage 395 for energizing solenoid 145 to lift the latch lever 80 and the pawl 84. The operation upon the closing of switch 360 has heretofore been described. The handle 390** greatly facilitates the operation of the elevating mechanism by a single operation.

In operating a pile elevating mechanism of the type disclosed herein, it is desirable to be able to adjust the support 35 for the pallet on the main hoist to enable the plane of the pallet to be adjusted. When a new pile is brought into position on the main hoist, the front edge thereof or one side thereof may be considerably higher than the remainder of the pile due to moisture, etc., as is well understood by those skilled in the art. In the event that an irregular pile is positioned on the main hoist, it is desirable to be able to adjust the plane of the pallet so that the top of the pile is substantially level, insofar as possible. To this end, the pulleys 23, 27 for supporting the front cables 25, 30 are mounted on members which are adjustable about pivots. The mounting for the pulley 27 is shown in detail in Fig. 22 and, as shown therein, comprises a member 410 on which the pulley is journaled and a pin 411 which pivotally connects the member 410 to the side frame 19. The member 410 is substantially horizontal and when moved about the pivot pin 411 raises or lowers the pulley supported thereby, depending upon its direction of movement. The member 410 may be raised or lowered by operating a screw 413 which threadingly engages a bore in a pin 414 carried by the member 410, the screw 413 depending from a bearing support carried by the frame of the mechanism. The screw may be rotated by operating a handwheel 415 fixed to a shaft 416 geared to rotate the screw. The support for the pulley 27 is a known type of support used in pile elevating mechanism of the type described and is, therefore, not described in detail.

The position of the pulley support member 410 is sensed by limit switches 418, 419 disposed respectively above and below a part of the member 410 so that when the member 410 is moved in either direction from a horizontal position, the movement of the member actuates one of the limit switches.

The pulley 23 is supported in a manner similar to the pulley 27, the parts thereof which appear in the drawing have been given the same number with a prime affixed thereto as the corresponding part for supporting pulley 27. Limit switches 420, 421 are operated if the pulley support member for the pulley 23 is moved from its horizontal position, the cables of the hoist being such that the pallet support 35 is level if the pulley support members for pulleys 23, 27 are horizontal.

The limit switches 418–421 are shown on the circuit diagram and operate relays 422, 423, 424, 425, respectively. The energization of any one of the relays 422–425 closes the contacts of the relays, designated with the same number as the relays but with an "*a*" or a "*b*" added thereto. The contacts **422*a*–425*a*** are connected in parallel and when any one is closed, complete a circuit from L1*c* to the L1*c* side of alarm 313 to energize the alarm 313 and the lamp 314 continuously provided a limit switch 428 is closed. The limit switch 428 is positioned on the front column 16 and is closed by the main hoist approximately one inch before it closes the limit switch 216 to signal the transfer of the pallet to the auxiliary hoist. If one of the switches 418–421 is closed when the limit switch 428 is actuated, indicating that the main hoist was previously adjusted out of level to compensate for an uneven height pile, the alarm 313 sounds and the light 314 is energized. Furthermore, the circuit for energizing relay coil 308 when the switch 216 is closed one inch after the closing of the limit switch 428 includes the normally closed contacts **422*b*, 423*b*, 424*b*, 425*b* connected in series so that, if any one of the relays is actuated, the switch 216 is ineffective to actuate the relay coil 308** to signal that the pile should be transferred.

In addition to the contacts described above, the relay coils 422–425 also have contacts designated respectively by the reference numerals **422*c*, 423*c*, 424*c*, 425*c*. The contacts 422*c*–425*c* energize lamps 430, 431, 432 and 433, respectively, to indicate which of the limit switches is closed, which, in turn indicates to the operator which pulley is to be adjusted and the direction of adjustment to effect a levelling of the pallet on the main pile hoist. It can readily be seen that by adjusting pulleys 23, 27 the pallet support can be levelled side to side, as well as front to back. When the main pile hoist has been levelled or if it was level to begin with, the relays 422–425 will be deenergized, extinguishing any of the lights 430–433 that may have been energized and closing all of the normally closed contacts 422*b*–425*b* in the circuit for energizing relay coil 308 upon actuation of switch 216**.

During operation of the described pile elevating mechanism, it is desirable that the pawl lift member 91 not be dropped suddenly to allow the pawl 84 to quickly drop into engagement with the ratchet wheel 90. In the preferred embodiment, a snubber cylinder 440 is provided (see Fig. 6). A piston operates in the snubber cylinder and has a piston rod 441 which extends upwardly therefrom and is connected to a bracket 442 by a noddle pin connection 443. The bracket 442 is fixed to the lever 140 for raising the lever 142 to effect a lifting of the pawl lift member 91 and its arm 92. The snubber cylinder 440 acts to cause the lever 143 to drop slowly when the lever 140 is released.

It can now be seen that the present invention has provided a new and improved pile elevating mechanism and while the preferred embodiment has been described in considerable detail, it is hereby my intention to cover all modifications, constructions and arrangements which fall within the ability of those skilled in the art and the scope and spirit of the present invention.

Having thus described my invention, what I claim is:

1. In a pile elevating mechanism including a main hoist for lifting a pallet carrying a sheet pile to a level where sheets are removed one at a time from the top thereof and for elevating the pile as the sheets are taken to maintain the top of the pile at approximately said level, and an auxiliary hoist disposed above the main hoist and adapted to take a partially depleted pile therefrom after a predetermined elevation of said main hoist and to continue the elevation of the pallet and pile as the sheets are removed from the latter while the main hoist is lowered and a new pile positioned thereon, said auxiliary hoist having a lower position in which it is to be positioned preparatory to taking a pile from said main hoist when the latter reaches a position at or above said predetermined elevation, said auxiliary hoist comprising a lifting frame, power actuated means operable to raise and lower said frame, pallet-supporting members, means mounting said members adjacent opposite sides of said frame and supporting the members for movement to and from pallet-supporting positions in which said members are adapted to support a pallet and elevate the latter upon the raising of said frame, means operatively connected to said members to actuate the latter between said positions, and control means responsive to operation of the actuating means to move said members from their pallet-engaging position for operating said power actuated means to lower said auxiliary hoist to said lower position.

2. In a pile elevating mechanism including a main hoist for lifting a pallet carrying a sheet pile to a level where sheets are removed one at a time from the top thereof and for elevating the pile as the sheets are removed to maintain the top of the pile at approximately said level, and an auxiliary hoist disposed above the main hoist and adapted to take said pallet and the remnant pile thereon after a predetermined elevation of said main hoist and to continue the elevation of the pallet and pile as the sheets are removed from the latter while the main hoist is lowered and a new pile positioned thereon, said auxiliary hoist having a lower position in which it is to be positioned preparatory to taking a pile from said main hoist when the latter reaches a position at or above said predetermined elevation and said pallet being withdrawable from the auxiliary hoist to combine said remnant pile with a pile on the main hoist, said auxiliary hoist comprising a lifting frame, power actuated means operable to raise and lower said frame, pallet-supporting members, means mounting said members adjacent opposite sides of said frame and supporting the members for movement to and from pallet-supporting positions in which said members are adapted to support a pallet and elevate the latter upon the raising of said frame, actuating means operatively connected to said members to actuate the latter between said positions, control means responsive to operation of the said actuating means to move said members from their pallet-engaging position for operating said power actuated means to lower said auxiliary hoist to said lower position, and means responsive to the completion of the pallet withdrawal operation for signalling the movement of said supporting members from pallet-supporting position.

3. In a pile elevating mechanism including a main hoist for lifting a pallet carrying a sheet pile to a level where sheets are removed one at a time from the top thereof and for elevating the pile as the sheets are removed to maintain the top of the pile at approximately said level, and an auxiliary hoist disposed above the main hoist and adapted to take the pallet and the remnant pile thereon from the main hoist after a predetermined elevation of the main hoist and to continue the elevation of the pallet and pile as the sheets are removed from the remnant pile while the main hoist is lowered and a new pile positioned thereon, said auxiliary hoist having a lower position in which it is to be positioned preparatory to taking a pallet from said main hoist when the latter reaches a position at or above said predetermined elevation, said auxiliary hoist comprising a lifting frame, power actuated means operable to raise and lower said frame, pallet-supporting members, means mounting said members adjacent opposite sides of said frame and supporting the members for movement to and from pallet-supporting positions in which said members are adapted to support a pallet and elevate the latter upon the raising of said frame, said pallet-supporting members being engageable with the pallet on the main hoist by raising said frame with said members in pallet-supporting position to move the members from below the pallet into engagement therewith, control means responsive to the actuation of said members to their pallet-supporting position to operate said power actuated means to raise said auxiliary hoist, and means responsive to the lifting of a pallet by said members for terminating operation of said power actuated means in response to said control means.

4. In a pile elevating mechanism, the structure as defined in claim 3 wherein means is provided for sensing and signalling relative vertical movement between said auxiliary hoist and a pallet thereon in pile-supporting position comprising switch means on said auxiliary hoist and actuated by said pallet.

5. In a pile elevating mechanism including a main hoist for lifting a pallet carrying a sheet pile to a level where sheets are removed one at a time from the top thereof and for elevating the pile as the sheets are removed to maintain the top of the pile at approximately said level, and an auxiliary hoist disposed above the main hoist and adapted to take said pallet and remnant pile thereon from said main hoist after a predetermined elevation of the main hoist and to continue the elevation of the pallet and pile as the sheets are removed from the latter while the main hoist is lowered and a new pile positioned thereon, said auxiliary hoist having a lower position in which it is to be positioned preparatory to taking a pallet from said main hoist when the latter reaches a position at or above said predetermined elevation, said auxiliary hoist comprising a lifting frame, power actuated means operable to raise and lower said frame, pallet-supporting members, means mounting said members adjacent opposite sides of said frame and supporting the members for movement to and from pallet-supporting positions in which said members are adapted to support a pallet and elevate the latter upon the raising of said frame, said pallet-supporting members being engageable with the pallet on the main hoist by raising said frame with said members in pallet-supporting position to move the members from below the pallet into engagement therewith, control means responsive to the actuation of said members to their pallet-supporting position to operate said power actuated means to raise said auxiliary hoist, pile height detecting means for controlling said auxiliary hoist in accordance with the top of a pile thereon, and means responsive to the lifting of a pallet by said members for terminating operation of said power actuated means in response to said control means and placing the auxiliary hoist under the control of said pile height detecting means.

6. In a pile elevating mechanism including a main hoist for lifting a pallet carrying a sheet pile to a level where sheets are removed one at a time from the top thereof and for elevating the pile as the sheets are removed to maintain the top of the pile at approximately said level, and an auxiliary hoist disposed above the main hoist and adapted to take said pallet and remnant pile thereon from the main hoist after a predetermined elevation of the main hoist and to continue the elevation of the pallet and pile as the sheets are removed from the latter while the main hoist is lowered and a new pile is being positioned thereon, said auxiliary hoist having a lower position in which it is to be positioned preparatory to taking a pallet from said main hoist when the latter reaches a position at or above said predetermined elevation, said auxiliary hoist comprising a lifting frame, power actuated means operable to raise and lower said frame, pallet-supporting members, means mounting said members adjacent opposite sides of said frame and supporting the members for movement to and from pallet-supporting positions in which said members are adapted to support a pallet and elevate the latter upon the raising of said frame, said pallet-supporting members being engageable with the pallet on the main hoist by raising said frame with said members in pallet-supporting position to move the members from below the pallet into engagement therewith, control means responsive to the actuation of said members to their pallet-supporting position to operate said power actuated means to raise said auxiliary hoist, means responsive to the lifting of a pallet by said members for terminating operation of said power actuated means in response to said control means, and control means responsive to the actuation of said members from their said pallet-supporting position to effect operation of said power actuated means to lower said auxiliary hoist to said lower position.

7. A pile elevating mechanism as defined in claim 6 wherein the pallet on said auxiliary hoist is withdrawable to deposit the remnant pile thereon onto a pile on the main hoist and further comprising means responsive to the completion of the pallet withdrawal operation to signal the movement of said supporting members from pallet-supporting position.

8. In a pile elevating mechanism, the structure as defined in claim 6 wherein means is provided for sensing and signalling relative vertical movement between said auxiliary hoist and a pallet thereon in pile supporting position comprising switch means on said auxiliary hoist and actuated by said pallet.

9. In an elevating mechanism having an auxiliary hoist adapted to take a load from a main hoist and continue the elevation thereof, said auxiliary hoist comprising a frame supported for up and down movement, power actuated mean for raising and lowering said frame, load engaging members adjacent opposite sides of said frame and each having first and second positions in lifting engagement with and clear of said load respectively, means mounting said members on said frame for movement between said positions, actuating means operable between first and second positions respectively for operating said members between their first and second positions respectively, control means responsive to the operation of said actuating means to its said second position to effect operation of said power actuated means to lower said frame, and means responsive to the movement of said frame to a predetermined low position to terminate operation of said power actuated means in response to said control means.

10. In an elevating mechanism having an auxiliary hoist adapted to take a load from a main hoist and continue the elevation thereof, said auxiliary hoist comprising a frame supported for up and down movement, power actuated means for raising and lowering said frame, load engaging members adjacent opposite sides of said frame and each having first and second positions in lifting engagement with and clear of said load respectively, said members having portions engageable with said load when said members are in said first position by raising the frame to raise the load engaging portions of said members from below the parts of the load engaged thereby, means mounting said members on said frame for movement between said positions, actuating means operable between first and second positions for operating said members between their first and second positions respectively, control means responsive to the operation of said actuating means to its said second position to effect operation of said power actuated means to lower said frame, and means responsive to the movement of said frame to a predetermined low position to terminate operation of said power actuated means in response to said control means, second control means responsive to the movement of said load engaging members to their first positions to effect operation of said power actuated means to raise said frame, and means responsive to the engagement of said members with said load for terminating the operation of said power actuated means in response to said second control means.

11. In an elevating mechanism having an auxiliary hoist adapted to take a load from a main hoist and continue the elevation thereof, said auxiliary hoist comprising a frame supported for up and down movement, power actuated means for raising and lowering said frame, load engaging members adjacent opposite sides of said frame and each having first and second positions in lifting engagement with and clear of said load respectively, said members having portions engageable with said load when in said first position by raising the frame to raise the load engaging portions thereof from below the parts of the load engaged thereby, means mounting said members on said frame for movement between said positions, actuating means operable between first and second positions for operating said members between their first and second positions respectively, control means responsive to the operation of said actuating means to its said second position to effect operation of said power actuated means to lower said frame, means responsive to the movement of said frame to a predetermined low position to terminate operation of said power actuated means in response to said control means, second control means responsive to the movement of said load engaging members to their first positions to effect operation of said power actuated means to raise said frame, and means responsive to the engagement of said members with said load for terminating the operation of said power actuated means in response to said second control means and comprising switch means on one of said members actuated by said load.

12. In a pile elevating mechanism having a main hoist for elevating a pile of sheets to a feed level where the top sheets are removed one at a time, an auxiliary hoist adapted to take a pile of sheets from the main hoist and continue the elevation thereof to maintain the top thereof at feed level, said auxiliary hoist comprising a frame supported for up and down movement, power actuated means for raising and lowering said frame, load engaging members adjacent opposite sides of said frame and each having first and second positions in lifting engagement with and clear of said load respectively, said members having portions engageable with said load when in said first position by raising the frame to raise the load engaging portions thereof from below the parts of the load engaged thereby, means mounting said members on said frame for movement between said positions, actuating means operable between first and second positions respectively for operating said members between their first and second positions respectively, control means responsive to the operation of said actuating means to its said second position to effect operation of said power actuated means to lower said frame, means responsive to the movement of said frame to a predetermined low position to terminate operation of said power actuated means in response to said control means, second control means responsive to the movement of said load engaging members to their first positions to effect operation of said power actuated means to raise said frame, means responsive to the engagement of said members with said load for terminating the operation of said power actuated means in response to said second control means, sensing means associated with said main hoist and responsive to a condition indicative of depletion of the pile thereon to a predetermined point to signal the movement of said members to their said first position.

13. In an elevating mechanism, the structure as defined in claim 12 wherein said load comprises a pallet having a pile of sheets thereon and said pallet is horizontally withdrawable from said auxiliary hoist to deposit the pile thereon onto the auxiliary hoist, the structure further comprising sensing means operatively associated with said auxiliary hoist and responsive to a condition indicative of the depletion of the pile thereon to a predetermined level for signalling the withdrawal of said pallet.

14. In an elevating mechanism, the structure as defined in claim 13 wherein sensing means is provided responsive to a condition indicative of completion of the pallet withdrawal operation to signal the movement of said members to their said second positions.

15. In an elevating mechanism having an auxiliary hoist adapted to take a load from a main hoist and continue its elevation, said auxiliary hoist comprising a frame supported for up and down movement, power actuated means for raising and lowering said frame, load engaging members adjacent opposite sides of said frame and each having first and second positions in lifting engagement with and clear of said load respectively, said members having portions engageable with said load when in said first position by raising said frame to raise the load engaging portions thereof from below the parts of the load engaged by said portions, means mounting said members on said frame for movement between said positions, actuating means operable between first and second positions for operating said members between their said first and second positions respectively, control means responsive to the actuation of said load engaging members to their said first position to effect operation of said power actuated means to raise said frame, and means responsive to the engagement of said members with said load for terminating the operation of said power actuated means in response to said control means.

16. In an elevating mechanism having an auxiliary hoist adapted to take a load from a main hoist and continue its elevation, said auxiliary hoist comprising a frame supported for up and down movement, power actuated means for raising and lowering said frame, load engaging members adjacent opposite sides of said frame and each having first and second positions in lifting engagement with and clear of said load respectively, said members being engageable with said load when in said first position by raising said frame to raise the load engaging portions thereof from below the parts of the load engaged by said portions, means mounting said members on said frame for movement between said positions, actuating means operable between first and second positions for operating said members between their said first and second positions respectively, control means responsive to the actuation of said load engaging members to their said first position to effect operation of said power actuated means to raise said frame, and means responsive to the engagement of said members with said load for terminating the operation of said power actuated means in response to said control means comprising switch means carried by one of said members and actuated by said load.

17. In a pile elevating mechanism, the structure as defined in claim 16 which further includes switch means for sensing relative vertical movement between the auxiliary hoist and the load carried thereby.

18. In a pile elevating mechanism, the structure as defined in claim 1 wherein said main hoist includes a support for supporting the pallet, means for adjusting said support to adjust the plane of the support and pallet thereon, and means for sensing and signalling when the plane of said support and pallet thereon is disposed angularly with respect to a horizontal plane.

19. In a pile elevating mechanism as defined in claim 18 wherein said support is supported by first and second pairs of cables connected to opposite ends thereof at spaced points and respective pulleys are provided for each of said cables, the elevating mechanism further comprising individual members supporting the pulleys for one of said pairs of cables and movable up and down to adjust the plane of said support and pallet thereon, said individual members having a predetermined position in which said support is level and said means for sensing the plane of said pallet comprising means for sensing displacement of said members from said position.

20. In a pile elevating mechanism, the structure as defined in claim 3 wherein said main hoist includes a support for supporting the pallet, means for adjusting said support to adjust the plane of the support and pallet thereon, and means for sensing and signalling when the plane of said support and pallet thereon is disposed angularly with respect to a horizontal plane.

21. In a pile elevating mechanism as defined in claim 20 wherein said support is supported by first and second pairs of cables connected to opposite ends thereof at spaced points and respective pulleys are provided for each of said cables, the elevating mechanism further comprising individual members supporting the pulleys for one of said pairs of cables and movable up and down to adjust the plane of said support and pallet thereon, said individual members having a predetermined position in which said support is level and said means for sensing the plane of said pallet comprising means for sensing displacement of said members from said position.

22. In a pile elevating mechanism for elevating a pallet with a pile of sheets thereon to maintain the top of the pile at a level for removing sheets therefrom and including a main hoist having a pallet support and an auxiliary hoist adapted to take a pallet from the main hoist when the latter reaches a predetermined elevation and to continue the elevation of the pallet to maintain the top of the pile thereon at a feed level, said main hoist comprising means for adjusting the plane of the pallet support and sensing means for sensing that the plane of said support is level or not level.

23. In a pile elevating mechanism, the structure as defined in claim 22 wherein said main hoist includes first and second members movable up and down individually to adjust the vertical position of spaced points on said pallet support and the angularity of the support, and said sensing means comprises switch means actuated by the displacement of said members from respective positions corresponding to the level position of said support.

24. In a pile elevating mechanism, a support for carrying a pile of sheets, a first pair of cables connected to one end of said support at spaced points thereon, a second pair of cables connected to the opposite end of said support at spaced points thereon, respective pulleys for each of said cables disposed above said points, means for taking in or letting out said cables to raise or lower said support, individual members supporting each of the pulleys of at least one of said pairs for individual vertical adjusting movement, said members having a predetermined position when said support is level, and switch means disposed adjacent opposite sides of each of said members and actuated to signal displacement of said members from said predetermined positions and the direction of the displacement.

25. In a pile elevating mechanism, the structure defined in claim 24 including second switch means in series with the first switch means and actuated by the support for conditioning the first-said switch means to be effective when said support is in a preselected vertical position.

26. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed, an auxiliary hoist disposed above said main hoist and adapted to take a remnant pile from the latter and continue to elevate it to maintain the top thereof at feed level, pile height detecting means for determining the height of the pile from which sheets are being removed, control means responsive to a low level detection by said detecting means to effect an intermittent raising of the hoist which is supporting the pile at feed level to maintain the top of the pile at the proper level, means responsive to a predetermined elevation of the main hoist for signalling transfer of said pile to said auxiliary hoist, and means responsive to the taking of a pile by said auxiliary hoist to signal completion of the transfer.

27. A pile elevating mechanism according to claim 26 wherein the pile from which sheets are taken is supported by a pallet which is elevated by the main hoist and then taken by the auxiliary hoist, said auxiliary hoist being adapted to permit the horizontal withdrawal of the pallet thereon before the complete depletion of the remnant pile supported by the pallet to enable the remnant pile thereon to be deposited onto a new pile supported on the main hoist, and means responsive to a predetermined elevation of the auxiliary hoist for signalling the withdrawal of the pallet.

28. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed, an auxiliary hoist disposed above said main hoist and adapted to take a remnant pile from the latter and continue to elevate it to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, said main hoist comprising power actuated drive means operable in opposite directions for raising or lowering the main hoist in a continuous manner and means for effecting the intermittent raising of said main hoist under the control of said pile height detecting means, and second control means for selectively operating said power actuated drive means to raise and lower said main hoist and including means for rendering the means for intermittently raising the main hoist under the control of said detecting means effective and ineffective and rendering it ineffective on operation of the second control means to operate said power actuated means to raise or lower the main hoist, and signal means responsive to the raising of said main hoist to a predetermined elevation for signalling the transfer of the pile thereon to said auxiliary hoist.

29. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed, an auxiliary hoist disposed above said main hoist and adapted to take a remnant pile from the latter and continue to elevate it to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, said main hoist comprising power actuated drive means operable in opposite directions for raising or lowering the main hoist in a continuous manner and means for effecting the intermittent raising of said main hoist under the control of said pile height detecting means, second control means for selectively operating said power actuated drive means to raise and lower said main hoist and including means for rendering the means for raising the main hoist under the control of said detecting means effective and ineffective and rendering it ineffective on operation of the second control means to operate said power actuated means to raise or lower the main hoist, signal means responsive to the raising of said main hoist to a predetermined elevation for signaling the transfer of the pile thereon to said auxiliary hoist, and signal means responsive to the taking of a pile by said auxiliary hoist for signalling the lowering of said main hoist to receive a new pile.

30. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed, an auxiliary hoist disposed above said main hoist and adapted to take a remnant pile from the latter and continue to elevate it to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, said main hoist comprising power actuated drive means operable in opposite directions for raising or lowering the main hoist in a continuous manner and means for effecting the intermittent raising of said main hoist under the control of said pile height detecting means, second control means for selectively operating said power actuated drive means to raise and lower said main hoist and including means for rendering the means for raising the main hoist under the control of said detecting means effective and ineffective and rendering it ineffective on operation of the second control means to operate said power actuated means to raise or lower the main hoist, and signal means responsive to the taking of a pile by said auxiliary hoist for signalling the lowering of said main hoist to receive a new pile.

31. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed, an auxiliary hoist disposed above said main hoist and adapted to take a remnant pile from the latter and continue to elevate it to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, said main hoist comprising power actuated drive means operable in opposite directions for raising or lowering the main hoist in a continuous manner and means for effecting the intermittent raising of said main hoist under the control of said pile height detecting means, second control means for selectively operating said power actuated drive means to raise and lower said main hoist and including means for rendering the means for raising the main hoist under the control of said detecting means effective and ineffective and rendering it ineffective on operation of the second control means to operate said power actuated means to raise or lower the main hoist, and means responsive to the taking of a pile by said auxiliary hoist for preventing control of said main hoist by said pile height detecting means.

32. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed, an auxiliary hoist disposed above said main hoist and adapted to take a remnant pile from the latter and continue to elevate it to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, said main hoist comprising power actuated drive means operable in opposite directions for raising or lowering the main hoist in a continuous manner and means for effecting the intermittent raising of said main hoist under the control of said pile height detecting means, second control means for selectively operating said power actuated drive means to raise and lower said main hoist and including means for rendering the means for raising the main hoist under the control of said detecting means effective and ineffective and rendering it ineffective on operation of the second control means to operate said power actuated means to raise or lower the main hoist, and means responsive to the taking of a pile by said auxiliary hoist for preventing control of said main hoist by said pile height detecting means and signalling the lowering of said main hoist to receive a new pile.

33. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed, an auxiliary hoist disposed above said main hoist and adapted to take a remnant pile from the latter and continue to elevate it to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, said main hoist comprising power actuated drive means operable in opposite directions for raising or lowering the main hoist in a continuous manner and means for effecting the intermittent raising of said main hoist under the control of said pile height detecting means, second control means for selectively operating said power actuated drive means to raise and lower said main hoist and including means for rendering the means for raising the main hoist under the control of said detecting means effective and ineffective and rendering it ineffective on operation of the second control means to operate said power actuated means to raise or lower the main hoist, signal means responsive to the raising of said main hoist to a predetermined elevation for signalling the transfer of the pile thereon to said auxiliary hoist, and means responsive to the taking of a pile by said auxiliary hoist for preventing operation of said main hoist by said pile height detecting means and signalling the lowering of said main hoist to receive a new pile.

34. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level while sheets are removed therefrom, an auxiliary hoist disposed above said main hoist and adapted to take a remnant pile from the latter and continue its elevation intermittently to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, drive means for intermittently raising said main hoist under the control of said pile height detecting means, disconnect means for effectively connecting and disconnecting said detecting means to and from said drive means to render said detecting means effective and ineffective to operate said drive means, means responsive to the taking of the pile by said auxiliary hoist to operate said disconnect means to effectively disconnect said detecting means from said main hoist, and means selectively operable to raise and lower said main hoist independently of said pile height detecting means comprising control means operable to start and stop operation of the main hoist.

35. A pile elevating mechanism as defined in claim 34 wherein means is provided responsive to said means responsive to the taking of a pile by said auxiliary hoist for signalling the lowering of said main hoist to receive a new pile.

36. A pile elevating mechanism according to claim 34 wherein the pile from which sheets are taken is supported by a pallet which is elevated by the main hoist and then taken by the auxiliary hoist, said auxiliary hoist being adapted to permit the horizontal withdrawal of the pallet thereon before the complete depletion of the remnant pile supported by the pallet to enable the remnant pile thereon to be deposited onto a new pile supported on the main hoist, and wherein said means responsive to the taking of a pile by said auxiliary hoist comprises switch means on said auxiliary hoist operated by said pallet.

37. A pile elevating mechanism according to claim 34 wherein the pile from which sheets are taken is supported by a pallet which is elevated by the main hoist and then taken by the auxiliary hoist, said auxiliary hoist being adapted to permit the horizontal withdrawal of the pallet thereon before the complete depletion of the remnant pile supported by the pallet to enable the deposit of the remnant pile thereon onto a new pile supported on the main hoist, wherein said means responsive to the taking of a pile by said auxiliary hoist comprises switch means on said auxiliary hoist operated by said pallet, and further comprising means responsive to the raising of said auxiliary hoist to a predetermined position to signal pallet withdrawal and means responsive to said means responsive to the taking of a pile by said auxiliary hoist to signal the lowering of said main hoist.

References Cited in the file of this patent

UNITED STATES PATENTS 2,471,066 Hesson ---------------- May 24, 1949